(12) United States Patent
Marcus et al.

(10) Patent No.: US 10,761,021 B2
(45) Date of Patent: Sep. 1, 2020

(54) APPARATUS AND METHOD FOR MEASUREMENT OF MULTILAYER STRUCTURES

(71) Applicant: Lumetrics, Inc., Rochester, NY (US)

(72) Inventors: Michael A. Marcus, Honeoye Falls, NY (US); Kyle J. Hadcock, Webster, NY (US); Donald S. Gibson, West Henrietta, NY (US); Filipp V. Ignatovich, Rochester, NY (US)

(73) Assignee: Lumetrics, Inc., Rochester, NY (US)

( * ) Notice: Subject to any disclaimer, the term of this patent is extended or adjusted under 35 U.S.C. 154(b) by 9 days.

(21) Appl. No.: 16/172,910

(22) Filed: Oct. 29, 2018

(65) Prior Publication Data

US 2019/0162660 A1 May 30, 2019

Related U.S. Application Data

(63) Continuation-in-part of application No. 15/585,495, filed on May 3, 2017, now Pat. No. 10,190,977.

(51) Int. Cl.
*G01N 21/45* (2006.01)
*G01N 21/41* (2006.01)
(Continued)

(52) U.S. Cl.
CPC ......... *G01N 21/45* (2013.01); *G01B 9/02004* (2013.01); *G01B 9/02007* (2013.01);
(Continued)

(58) Field of Classification Search
CPC ......... G01N 21/45; G01N 2201/06113; G01B 9/02002; G01B 11/06; G01B 21/126; G01B 21/30; H01S 3/005; H01S 3/0071
See application file for complete search history.

(56) References Cited

U.S. PATENT DOCUMENTS 5,387,309 A * 2/1995 Bobel ................ G01B 11/0675
117/85
5,596,409 A 1/1997 Marcus et al.
(Continued)

OTHER PUBLICATIONS

Cannon, Robert William, "Automated Spectral Identification of Materials Using Spectral Identity Mapping" (2013) ETD Archive. Paper 761. EFS File Name: 20190323_16-172910_IDS_NPL_Cite1.

*Primary Examiner* — Dominic J Bologna
(74) *Attorney, Agent, or Firm* — Patent Innovations LLC; John M. Hammond

(57) ABSTRACT

A method of identifying the material and determining the physical thickness of each layer in a multilayer structure is disclosed. The method includes measuring the optical thickness of each of the layers of the multilayer object as a function of wavelength of a light source and calculating a normalized group index of refraction dispersion curve for each layer in the multilayer structure. The measured normalized group index of refraction dispersion curves for each of the layers is then compared to a reference database of known materials and the material of each layer is identified. The physical thickness of each layer is then determined from the group index of refraction dispersion curve for the material in each layer and the measured optical thickness data. A method for determining the group index of refraction dispersion curve of a known material, and an apparatus for performing the methods are also disclosed.

24 Claims, 21 Drawing Sheets

(51) Int. Cl.
*G01B 11/06* (2006.01)
*G01B 9/02* (2006.01)
*G01N 21/84* (2006.01)

(52) U.S. Cl.
CPC ........ *G01B 9/0209* (2013.01); *G01B 11/0675* (2013.01); *G01N 21/4133* (2013.01); *G01B 2290/45* (2013.01); *G01B 2290/60* (2013.01); *G01N 2021/458* (2013.01); *G01N 2021/8438* (2013.01)

(56) References Cited

U.S. PATENT DOCUMENTS

| | | | |
|---|---|---|---|
| 6,122,042 A | 9/2000 | Wunderman et al. | |
| 6,724,487 B2 | 4/2004 | Marcus et al. | |
| 2001/0043327 A1 | 11/2001 | Barney et al. | |
| 2001/0046054 A1* | 11/2001 | Zeylikovich | A61B 5/0059 356/497 |
| 2003/0227632 A1* | 12/2003 | Marcus | G01B 11/303 356/497 |
| 2007/0100580 A1* | 5/2007 | Marcus | G01B 11/0683 702/170 |
| 2014/0239181 A1* | 8/2014 | Hattori | G01B 11/0625 250/339.08 |
| 2015/0032417 A1* | 1/2015 | Zobel | G01N 21/4133 702/189 |
| 2016/0061720 A1 | 3/2016 | Lambert et al. | |

\* cited by examiner

APPARATUS AND METHOD FOR MEASUREMENT OF MULTILAYER STRUCTURES

CROSS-REFERENCE TO RELATED PATENT APPLICATIONS

This application is a continuation in part of co-pending U.S. patent application Ser. No. 15/585,495, filed on May 3, 2017, the disclosure of which is incorporated herein by reference.

BACKGROUND

Technical Field

The present invention relates to the non-destructive characterization of multilayer structures including determination of the number of layers, identification of the materials comprising each layer and the thickness of each layer in the multilayer structure.

Description of Related Art

Non-destructive product verification testing is important in many industries and is extremely important for multilayer structures used for a variety of commercial and military applications. Being able to identify the number of layers as well as the material that each layer is composed of in multilayer structures along with the thickness of each of the layers is becoming more and more important for product verification testing and is also useful in reverse engineering. It is extremely important to verify that the multilayer structures meet specifications in fields including automotive, aerospace and building glazing, transparent armor, compound lenses, semiconductors, displays, and bulletproof glass.

There are various methods of identifying single layer optical materials using the wavelength dependence of spectral properties including absorbance, reflectance, emission, scattering, fluorescence, Raman scattering, IR spectroscopy and index of refraction. As an example, the use of Raman spectroscopy is described in the master thesis entitled, "Automated Spectral Identification of Materials Using Spectral Identity Mapping" by Robert Cannon, May 2013. U.S. Pat. No. 6,122,042 entitled "Devices and Methods for Optically Identifying Characteristics of Material Objects" by Irwin Wunderman et al. describes a photometric analysis technique that collects scattered, reflected and emitted light. U.S. Patent Application Publication No. 2001/0043327 entitled "Spectral Identification System" by Bryan Barney et al. discloses the use of spectral reflectance over a broad spectral range from the ultra-violet (UV) to the near infrared (NIR) to identify materials. U.S. Patent Application Publication No. 2016/0061720 entitled "Method for Characterizing a Product by Means of Topological Spectral Analysis" by Didier Lambert et al. describes a method of creating a database of NIR data and using it to identify materials from their NIR spectra.

Optical dispersion in optical materials is the phenomenon in which the phase velocity of a wave depends on the wavelength of light λ traveling through the optical material. This results in a wavelength dependence of phase index of refraction which is different in different materials. An example of using optical dispersion to aid in material identification is provided by U.S. Patent Application Publication No. 2015/0032417 entitled "Systems and Methods for Identifying Optical Materials" by Jurgen Zobel ("Zobel '417" subsequently herein). Zobel '417 describes a method of material identification based on determining the index matching wavelength points for different index of refraction liquid standards. Zobel '417 uses the property of optical dispersion to identify the material in an optical material. In the measurement approach in Zobel '417 the index of refraction at is measured at three wavelengths by placing small grains of the material in different index matching fluids and determining which index matching fluid is the best fit at each of the three selected wavelengths. The temperature of the index of refraction liquid standards is also well characterized and the temperature that best matches the index of refraction of the material under test can also be found. However, the measurement procedure used in Zobel '417 is destructive since it requires the sample to be shattered into small grains and immersing it in the index matching liquids. It also can only measure one material at a time and is tedious.

Low-coherence interferometry (LCI) has applications in many fields from medical imaging to glass manufacturing. Low-coherence interferometry is based on using a light source with a relatively short coherence length on the order of 1.0-40 micrometers (μm). The light is split between two arms of an interferometer and then recombined and directed onto a detector. Interference will occur when the path lengths of the two arms of the interferometer are equal to within a few coherence lengths of the light source.

There are numerous known configurations of such interferometers, such as the Michelson, Mach-Zehnder, and Fizeau interferometers, and others described in the text, Principles of Optics: Electromagnetic Theory Of Propagation, Interference and Diffraction of Light, M. Born and E. Wolf, Cambridge University Press, Cambridge, N.Y., 1999, 7th ed. Other examples of such interferometer and described in U.S. Pat. No. 6,724,487 of Marcus et al., "Apparatus and method for measuring digital imager, package and wafer bow and deviation from flatness," and in U.S. Pat. No. 5,596,409 of Marcus et al., "Associated Dual Interferometric Measurement Method for Determining a Physical property of an Object", the disclosure of which are incorporated herein by reference ("Marcus '409" subsequently herein). The interferometer disclosed therein by Marcus '409 includes a low-coherence interferometer and a coherent light interferometer which are associated with each other by sharing a common variable optical path delay element. A narrow beam of low-coherence light is directed onto the surface of the test object. It is common to focus the beam inside or in proximity to the test object. The reflected light from all of the object interfaces, which the beam traverses, is then collected and analyzed by the interferometer. The interferometer is used to extract the optical distances between all of the optical interfaces in the test object. The physical distances are obtained by dividing the optical distances by the group index of refraction (GRI) of the material which makes up the space between the interfaces. In a typical application, the light beam is directed along the optical axis of a lens. The axial thickness of the lens is then obtained by dividing the measured optical distance by the known group index of refraction of the glass or plastic material of the lens.

None of the above methods can both non-destructively determine the number of layers in a multilayer structure and characterize the material used in each of the layers of the multilayer structure in the correct physical order of the materials in the structure. The disclosure of these patents and published patent applications notwithstanding, there remains an unmet need to be able to identify the material that each of the layers in a multilayer structure is composed of non-destructively. There also remains an unmet need to determine the thickness of each of the layers in the multilayer structure while identifying the material composition of each of the layers in the multilayer structure. Such a measurement method and system would be an important advance to the fields of non-destructive product verification testing and reverse engineering.

SUMMARY

In accordance with the present disclosure, the unmet need for a measurement system and method that enables non-destructive material characterization of each of the layers in a multilayer structure is addressed by providing an interferometer apparatus with a low-coherence tunable light source which can be tuned to a set of k distinct center wavelengths to determine the group index of refraction of each of the layers in the multilayer structure as a function of wavelength. From the wavelength dependence of the group index of refraction data, the material that each of the layers in the multilayer structure is composed of can be identified by comparing the measured data to that of a reference database containing the group index of refraction dispersion curves of known materials. For materials that are not in the reference database, the characterization includes determining the group index of refraction dispersion curve for the material and adding it to the reference database of known material group index of refraction dispersion curves.

In a first embodiment of the invention a method of characterizing each layer in a multilayer structure comprising m layers where m is an integer greater than 1 is provided. The method comprises the steps of providing an interferometer apparatus with a low-coherence tunable light source which can be tuned to a set of k distinct center wavelengths where k is an integer greater than 2, aligning a portion of the multilayer structure with respect to a measurement region of the interferometer apparatus, using the interferometer apparatus to observe layers in the multilayer structure and measuring the optical thickness of each of the observed layers in the multilayer structure with the low-coherence tunable light source being tuned to each of the k distinct center wavelengths. The method also includes the step of determining the number of layers m in the multilayer structure by setting m equal to the maximum number of observed layers measured using the low-coherence interferometer with the low-coherence tunable light source tuned to each of the k distinct center wavelengths. The method of characterizing each of the m layers in the multilayer structure may also comprise the steps of comparing the optical thickness measured with the low-coherence tunable light source tuned to each of the k distinct center wavelengths to a reference database of known material group index of refraction dispersion curves measured at the same set of k distinct center wavelengths and determining which layers have a best fit material in the reference database and identifying the material composition of each of the m layers which have a best fit material in the reference database. The multilayer structure may also be comprised of a measurement cell consisting of a top optical flat and a bottom optical flat separated by a spacer containing a receiving surface located above the top optically flat surface of the bottom optical flat and below the bottom optically flat surface of the top flat for disposing a sample containing a layer of a material to be added to the reference database of known materials.

A second embodiment of the invention is an apparatus for characterizing each layer in a multilayer structure comprising m layers where m is an integer greater than 1. The apparatus comprises an interferometer having a low-coherence light source tunable to a set of k distinct center wavelengths where k is an integer greater than 2. The apparatus is adapted to observe layers in the multilayer structure, and to measure the optical thickness of each of the observed layers in the multilayer structure while the low-coherence tunable light source is tuned to each of the k distinct center wavelengths. The apparatus also comprises a computer operable to execute an algorithm to determine the number of layers m in the multilayer structure, to determine which of the m layers have a best fit material in a reference database of known material group index of refraction dispersion curves which include data measured at the same set of k distinct center wavelengths, and to identify the material composition and thickness of the layers which have a best fit material in the reference database.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The present disclosure will be provided with reference to the following drawings, in which like numerals refer to like elements, and in which.

DETAILED DESCRIPTION

Figure 1:
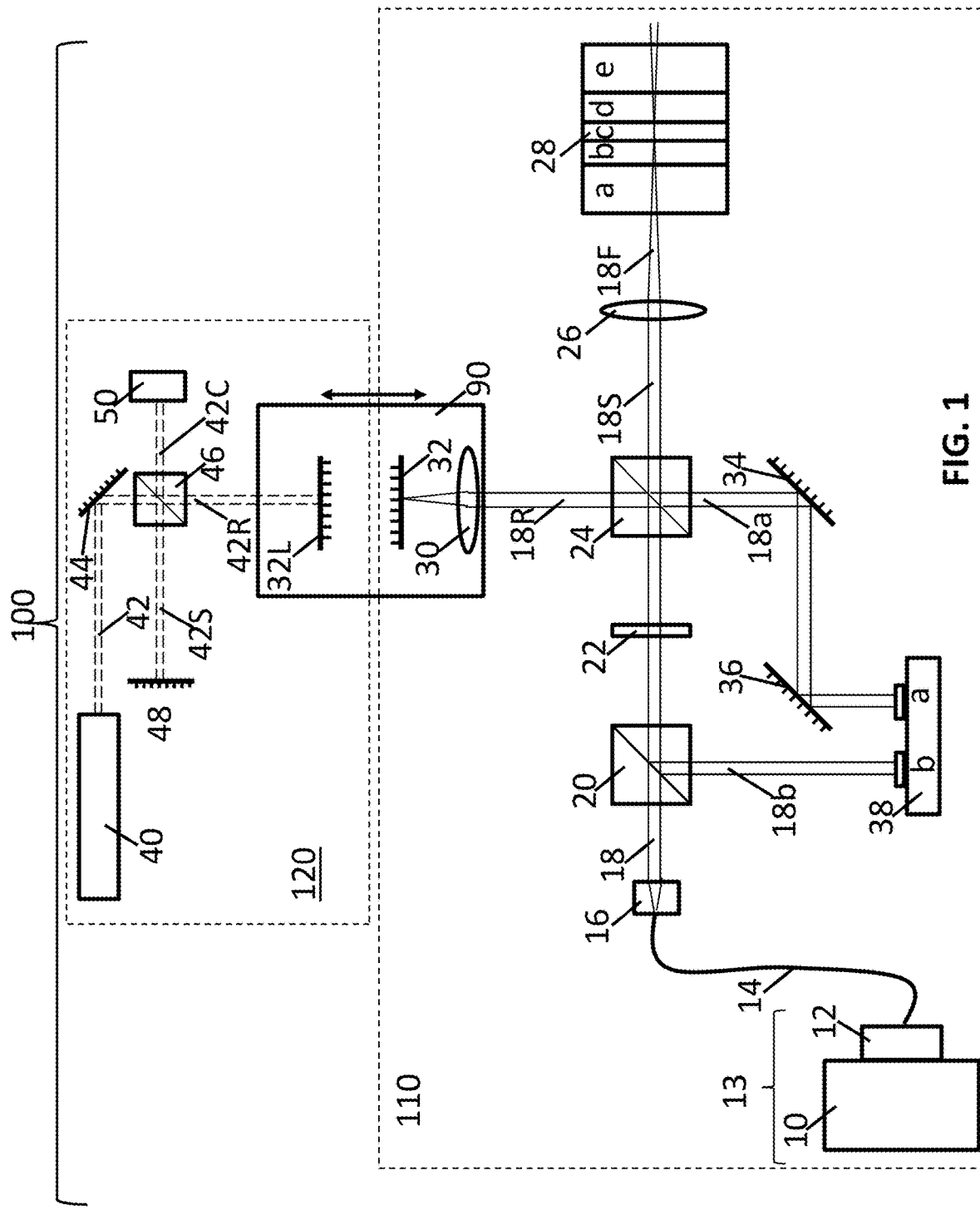
FIG. 1 shows a schematic of a first embodiment of an interferometer apparatus used to measure the optical thickness of each of the layers in a multilayer structure as a function of wavelength.

The present description is directed in particular to elements forming part of, or cooperating more directly with, apparatus in accordance to the present invention. For a general understanding of the present invention, reference is made to the drawings. It is to be understood that elements not specifically shown or described may take various forms well known to those skilled in the art. In the following description and drawings, identical reference numerals have been used, where possible, to designate identical elements. Figures shown and described herein are provided in order to illustrate key principles of operation of the present invention and are not drawn with intent to show actual size or scale. Some exaggeration, i.e., variation in size or scale may be necessary in order to emphasize relative spatial relationships or principles of operation. One of ordinary skill in the art will be able to readily determine the specific size and interconnections of the elements of the example embodiments of the present invention. The term "providing", such as for "providing an interferometer apparatus" and the like, when recited in the claims, is not intended to require any particular delivery or receipt of the provided item. Rather, the term "providing" is merely used to recite items that will be referred to in subsequent elements of the claim(s), for purposes of clarity and ease of readability.

In the following disclosure, the present invention is described in the context of an apparatus and method of characterizing each layer in a multilayer structure. The characterization includes determining the optical thickness of each of the layers, the number of layers in the multilayer structure, to identify the material comprising each layer of the multilayer structure and to determine the physical thickness of each of its layers. In the context of the present disclosure, a suitable multilayer structure is considered to be an object comprised of m layers where m is a positive integer greater than 1, each of the m layers being at least partially transparent to light over at least part of the optical spectrum and has an optical interface with each of its adjacent layers. The optical spectrum is defined as the portion of the electromagnetic spectrum ranging from the extreme ultraviolet through the far-infrared. When the term "multilayer structure" is used in the context of the present disclosure, it is to be understood that the multilayer structure is partially optically transmissive over at least part of the optical spectrum over which the measurement is performed. The multilayer structure is also required to have "nearly parallel" surfaces at the location of measurement. In the context of the present disclosure the term "nearly parallel" is defined to be parallel within ±3°. Each layer of the multilayer structure should also be 10 µm or greater in physical thickness. Example multilayer structures include automotive, aerospace and building glazing, transparent armor such as that found on tanks and armored vehicles, compound lenses, multilayer semiconductor wafers, displays and bulletproof glass. The multilayer structure may include air layers and liquid layers as well as solid material layers. A measurement cell including a pair of optical flats with or without samples mounted between them is a suitable multilayer structure.

Also throughout the present disclosure we use the term mirror which we define as a reflective surface or a partially reflective surface in which a negligible amount of light is transmitted. Furthermore, the terms refractive index and index of refraction can be used interchangeably. In the present disclosure, the terms thickness and physical thickness may be also used interchangeably.

Additionally, this description may identify certain components with the adjectives "top," "upper," "bottom," "lower," "left," "right," "horizontal," "vertical," "inner," "outer," "transmitted," "reflected," etc. These adjectives are provided in the context of use of the apparatus as a measurement device, and in the context of the orientation of the drawings, which is arbitrary. The description is not to be construed as limiting the apparatus to use in a particular spatial orientation. The instant apparatus may be used in orientations other than those shown and described herein. As an example in the disclosure we describe light beams incident on beam splitters which split the beam into transmitted and reflected light beams which then interact with different sets of components. It is to be understood that the orientation of the drawing can be altered so that the transmitted beam interacts with the components shown interacting with the reflected light beam and vice versa. When the beam splitter is used in an interferometer we call the two arms of the interferometer sample and reference arms.

The following description describes the details of our invention directed at identifying the material composition and physical thickness of each of the layers in a multilayer structure. In the practice of the invention an interferometer apparatus is used to first measure the optical thickness of each of the layers of a multilayer structure in order from top to bottom as a function of wavelength λ of a tunable light source. Throughout the discussion of the invention all materials and multilayer structures are measured at the same set of k distinct center wavelengths of the tunable light source defined as $\lambda_j$ where j is an integer and j=1 to k inclusively with $\lambda_1$ being the shortest center wavelength of the tunable light source and $\lambda_k$ being the longest wavelength of the tunable light source. Each successive wavelength measured is at a longer wavelength than the previous one so that $\lambda_1 < \lambda_2 < \lambda_3 \ldots < \lambda_{k-1} < \lambda_k$.

In our context, the term "optical thickness of a layer" is defined as the product of the group index of refraction times the physical thickness $[n_{gi}(\lambda_j)t_i]$ where $n_{gi}(\lambda_j)$ is the group index of refraction of the ith layer in the multilayer structure measured at wavelength $\lambda_j$ and $t_i$ is the physical thickness of the ith layer. For a multilayer structure comprised of m layers, the individual layers will be sequentially labeled with integers numbered from 1-m from top to bottom of the multilayer structure. The optical thickness measured for each of the layers will vary with wavelength of the filtered light source due to changes in the group index of refraction as a function of wavelength. The variation in optical thickness as a function of wavelength is different for different materials. In a first approach, we determine the normalized group index of refraction curve for each layer in the multilayer structure and then compare the data to normalized group index of refraction dispersion curves found in a reference database of known materials to identify the statistically best fit material for each of the layers in the multilayer structure. In a second approach we compare the measured optical thickness as a function of measurement center wavelength for each layer in the multilayer structure with a reference database of known material group index of refraction dispersion curves at the same set of center wavelengths and determine if there is a best fit material for that layer in the reference database. It is to be noted, that in order to be able to identify the material composition of a given layer in the multilayer structure, the material comprising that layer must be in the reference database of known materials. In some cases the material comprising a given layer may not yet be in the reference database of known materials. In this case there will usually not be a statistically best fit material for this layer, and the material for that layer will not be identified. We also describe how new materials can be added to the reference database of known material group index of refraction dispersion curves. When new materials are added to the reference data base, previously measured multilayer structures containing unidentified layers can be reanalyzed in order to determine if the material composition of any of the unidentified layers has been recently added to the database.

In the following disclosure, we first describe the apparatus and then describe how the optical dispersive properties measured can be used to identify the material that each of the layers in the multilayer structure is composed of and how to determine the physical thickness of each of the layers. We then describe how new materials can be added to the reference database of known materials.

Turning now to FIG. 1, a schematic of a first embodiment of an interferometer apparatus 100 used to measure the optical thickness of each of the layers in a multilayer structure 28 as a function of wavelength is shown. The interferometer apparatus 100 is a dual interferometer comprising a free-space low-coherence interferometer 110 (shown in the lower dashed rectangle) and a laser interferometer 120 (shown in the upper dashed rectangle). The two interferometers share a common variable optical path delay element 90 as described in Marcus '409. The laser interferometer 120 continuously measures the displacement of the reference path and is used to provide an accurate distance scale for the low-coherence interferometer as described in Marcus '409.

As shown in FIG. 1, the light source of the free space low-coherence interferometer 110 is a broadband low-coherence light source 10, and preferably a supercontinuum light source such as an NKT Photonics EXW-12 Supercontinuum light source (SCLS) which emits light over the wavelength range of 400-2400 nanometers (nm). The light coming out of the broadband light source 10 is coupled into a continuously variable wavelength tunable filter 12. The broadband low-coherence light source 10 and the continuously variable wavelength tunable filter 12 together form a tunable light source 13. For many materials, the preferred continuously variable wavelength tunable filter is one that can be tuned anywhere between 400 and 850 nm with a bandwidth being variable between 5 and 50 nm such as an NKT Photonics SuperK VARIA tunable wavelength filter. For other materials which do not transmit light in the visible range, including semiconductors such as silicon and germanium, tunable filters in the range of 1100 nm-2400 nm or longer are preferred. The preferred bandwidth range of the tunable filter is between 5-20 nm in order to deliver a near Gaussian wavelength distribution of light into the low-coherence interferometer. Light exiting the tunable filter 12 is coupled into a single mode fiber 14 which is preferably a single mode photonic crystal fiber (PCF) since it will function properly over the entire wavelength range of the tunable filter 12. The light transmitted through the single mode fiber 14 is coupled into a fiber collimator 16 which forms a collimated beam 18 shown as a pair of parallel solid lines in FIG. 1. The collimated light beam 18 is passed through a polarizing beam splitter (PBS) 20 which linearly polarizes the transmitted collimated light beam. The transmitted collimated linearly polarized light beam then passes through a quarter wave plate (QWP) 22 and is input into a beam splitter (BS) 24 which forms a Michelson interferometer. The beam splitter 24, preferably a 50/50 beam splitter, splits the input collimated beam 18 into a sample arm collimated beam 18S and a reference arm collimated beam 18R that travel through the sample and reference arms of the Michelson interferometer respectively.

Both the sample arm collimated beam 18S and the reference arm collimated beam 18R are comprised of incident light and reflected light portions as described below. The incident light portion of sample arm collimated beam 18S originates from the beam splitter 24 and passes through sample arm lens 26 and is focused onto the multilayer structure 28 under test as shown by the focusing low-coherence beam 18F. The focus region of the lens 26 defines the measurement region of the interferometer apparatus. Before measurement, the multilayer structure 28 is mounted in the measurement region of the low-coherence interferometer 110 and aligned so that its top and bottom surfaces are close to normal (within ±3°) to the center axis of the incident low-coherence beam 18F. The incident light portion of reference arm collimated beam 18R also originates from the beam splitter 24 and passes through reference arm lens 30 and is focused on the reference mirror 32. The sample and reference arm lenses 26 and 30 are preferably achromatic doublets or triplets in order to have the same focal length over the entire wavelength range of measurement.

The reference arm lens 30 and reference mirror 32 are co-mounted on a variable optical path delay element 90 as is laser reference mirror 32L. The variable optical path element is preferably a precision linear actuator, voice coil or translation stage which is moved during operation of the interferometer apparatus 100. Part of the light that is focused on the multilayer structure 28 through sample arm lens 26 reflects off each optical interface of the multilayer structure 28 and is recollimated by the sample arm lens 26 makes up the reflected light portion of sample arm collimated beam 18S. Similarly, the part of the incident light that is focused on the reference mirror 32 through the reference arm lens 30 and reflects off reference mirror 32 and is recollimated by the reference arm lens 30 makes up the reflected light portion of reference arm collimated beam 18R.

The multilayer structure shown in FIG. 1 is comprised of 5 layers 28a-28e and has 6 optical interfaces (air/28a, 28a/28b, 28b/28c, 28c/28d, 28d/28e and 28e/air). Light reflecting back from the reference mirror 32 and each of the optical interfaces in the multilayer structure 28 are recollimated at their respective reference arm lens 30 and sample arm lens 26 to form the reflected light portions of the reference and sample arm collimated beams 18R and 18S respectively. The reflected light portions of the reference and sample arm collimated beams 18R and 18S are then recombined at the 50/50 beam splitter 24 to form a collimated low-coherence interference beam. After being recombined the collimated low-coherence interference beam is split again at the same beam splitter 24 into a transmitted or first part of the low-coherence interference beam 18a and a reflected or second part of the low-coherence interference beam 18b. The transmitted low-coherence interference beam 18a is incident on the first detector 38a of a balanced detector 38 after reflecting off a pair of 45° mirrors 34 and 36. The reflected low-coherence interference beam 18b travels back through the quarter wave plate 22 and is incident on the polarizing beam splitter 20 where it is reflected and is made to be incident on a second detector 38b of the balanced detector 38. The balanced detector 38 signal is filtered, log amplified and the envelope of the low-coherence interferometer signal is measured as a function of distance traveled by the variable optical path delay element 90 during measurement. Use of balanced detection results in an improved signal to noise ratio due to removal of common mode noise and enables the ability to use higher powers without saturating the detector.

Figure 1A:
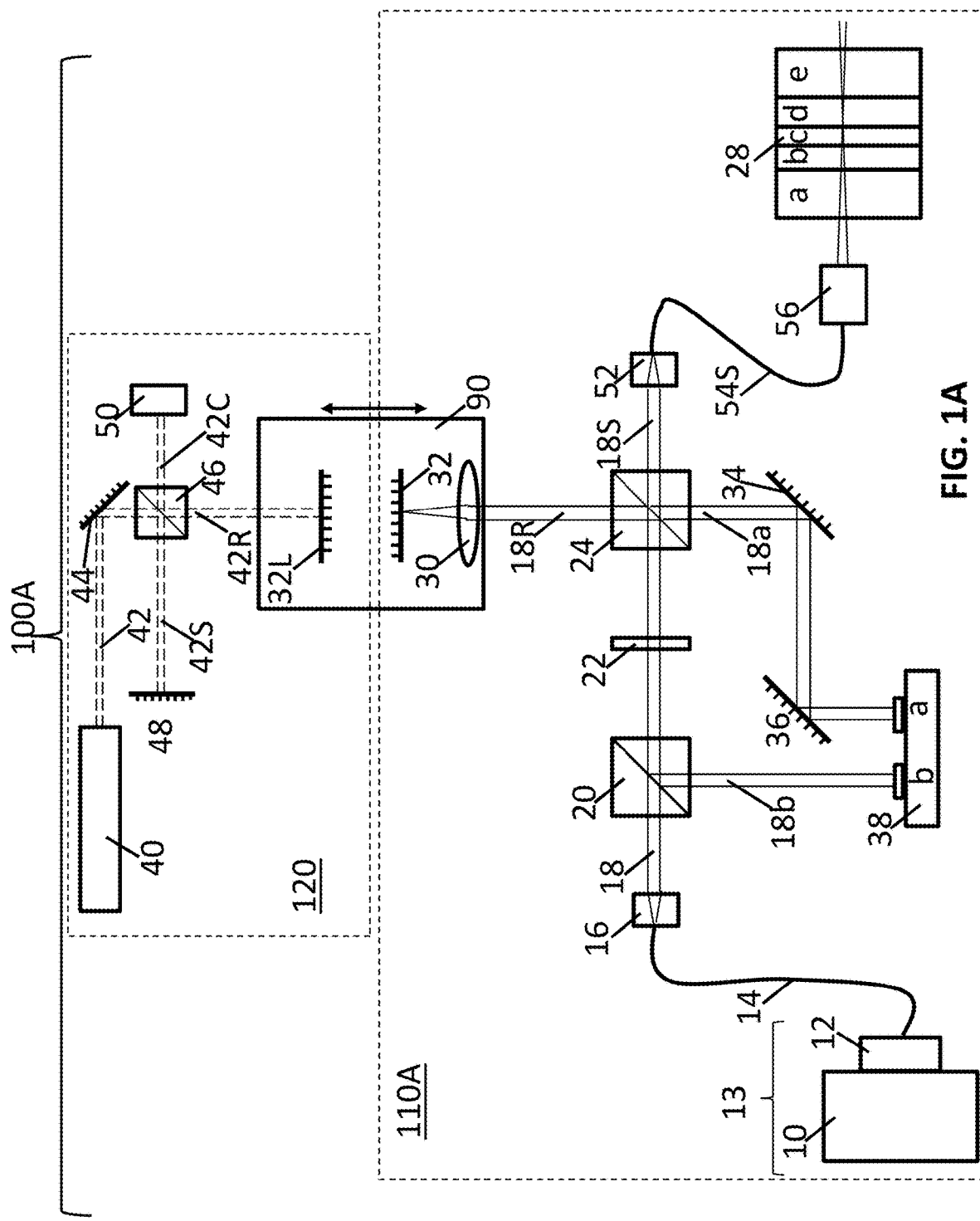
FIG. 1A shows a schematic of a second embodiment of an interferometer apparatus used to measure the optical thickness of each of the layers in a multilayer structure as a function of wavelength.

FIG. 1A shows a schematic of a second embodiment of an interferometer apparatus 100A used to measure the optical thickness of each of the layers in a multilayer structure 28 as a function of wavelength. Most of the components of interferometer apparatus 100 and 100A are the same, and all components of the laser interferometer 120 are the same in both embodiments. The only differences in the components between low-coherence interferometer 110A and low-coherence interferometer 110 occur in the sample arm of the low-coherence interferometer 110A. The focusing lens 26 is replaced with a fiber collimator 52 which is used to couple the incident light portion of sample arm collimated beam 18S into a sample arm optical fiber 54S which is then input into an optical probe 56 which focuses light onto the multilayer structure 28. Part of the light that is focused on the multilayer structure 28 through optical probe 56 reflects off each optical interface of the multilayer structure 28 back through optical probe 56 and sent back through optical fiber 54S and recollimated by fiber collimator 52 to form the reflected light portion of sample arm collimated beam 18S. As in low-coherence interferometer 110, the reflected light portions of the reference and sample arm collimated beams 18R and 18S of low-coherence interferometer 110A are recombined at the 50/50 beam splitter 24 to form a collimated low-coherence interference beam. The rest of the interferometer apparatus 100 and 100A are the same with identical functions. As with the input optical fiber 14, optical fiber 54S is preferably a single mode photonic crystal fiber (PCF) since it will function properly over the entire wavelength range of the tunable filter 12. The optical probe 56 can be readily configured to be portable or hand-held and readily aligned so that it is normal to the top surface of the multilayer structure 28. Hand-held probes are usually designed with a standoff distance that matches the focal length of the probe, so that when in contact with the top surface of the multilayer structure 28 the structure is automatically placed in the measurement region of the interferometer apparatus. Using an optical probe in the sample arm of the interferometer enables the interferometer apparatus to be portable so that it can be used to measure multilayer structures in their native environments such as building windows, automotive windows and aerospace windows. The optical probe can also be mounted to translation stages so that it can be moved over the surface of the multilayer structure 28.

Figure 1B:
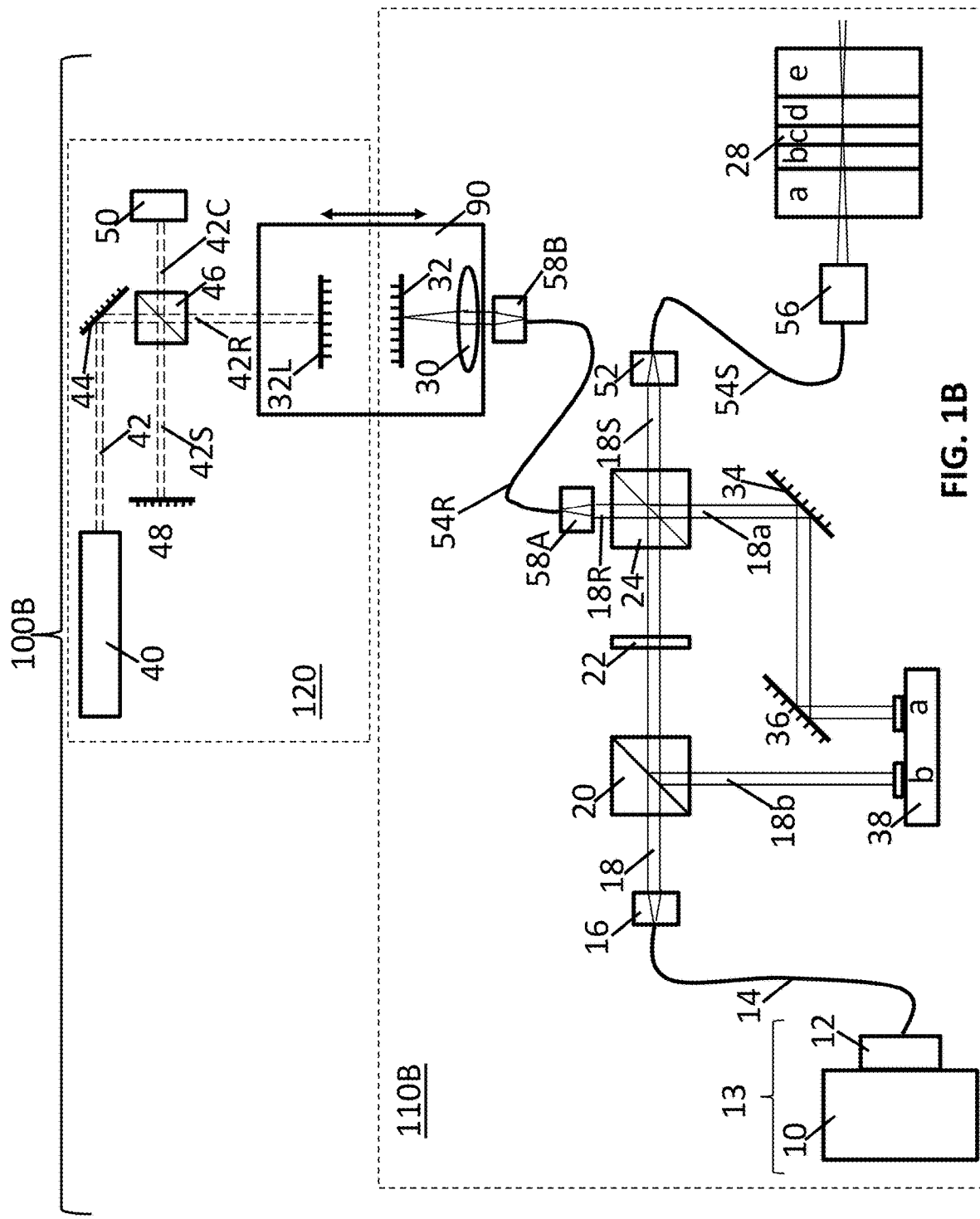
FIG. 1B shows a schematic of a third embodiment of an interferometer apparatus used to measure the optical thickness of each of the layers in a multilayer structure as a function of wavelength.

FIG. 1B shows a third embodiment of a dual interferometer apparatus 100B used to measure the optical thickness of each of the layers in a multilayer structure 28 as a function of wavelength. Most of the components of dual interferometer apparatus 100A and 100B are the same, and all components of the laser interferometer 120 are the same in both embodiments. The only differences in the components between low-coherence interferometer 110A and low-coherence interferometer 110B occur in the reference arm of the low-coherence interferometer 110B. Instead of the incident light portion of reference arm collimated beam 18R being directly incident on the reference arm lens 30 as shown in FIG. 1 and FIG. 1A, the incident light portion of reference arm collimated beam 18R shown in FIG. 1B part of the collimated beam 18R region is coupled into a fiber collimator 58A and transmitted through optical fiber 54R and coupled into a second fiber collimator 58B before being incident on reference arm lens 30 which then focuses the incident reference arm light onto reference mirror 32. Most of the light that is focused on reference mirror 32 passes back through reference arm lens 30, back through fiber collimator 58B, and transmitted back through optical fiber 54R and is recollimated by fiber collimator 58A to form the reflected light portion of reference arm collimated beam 18R. As in low-coherence interferometer 110, the reflected light portions of the reference and sample arm collimated beams 18R and 18S of low-coherence interferometer 110A are recombined at the 50/50 beam splitter 24 to form a collimated low-coherence interference beam. The rest of the dual interferometer apparatus 100A and 100B are the same with identical functions. As with the sample arm optical fiber 54S, optical fiber 54R is preferably a single mode photonic crystal fiber (PCF) since it will function properly over the entire wavelength range of the tunable filter 12. The dual interferometer configuration shown in FIG. 1B is preferred when the multilayer structure 28 needs to be tested remotely from the rest of the dual interferometer apparatus 100B. It is usual practice to match the optical path lengths of the sample and reference arm optical fibers 54S and 54R to minimize dispersion effects in the low-coherence interferometer. The continuous variable tunable filter 12 can also be replaced with a tunable filter 12a containing a discrete set of narrow bandpass filters having distinct center wavelengths as described below during the discussion of FIG. 1C.

Figure 1C:
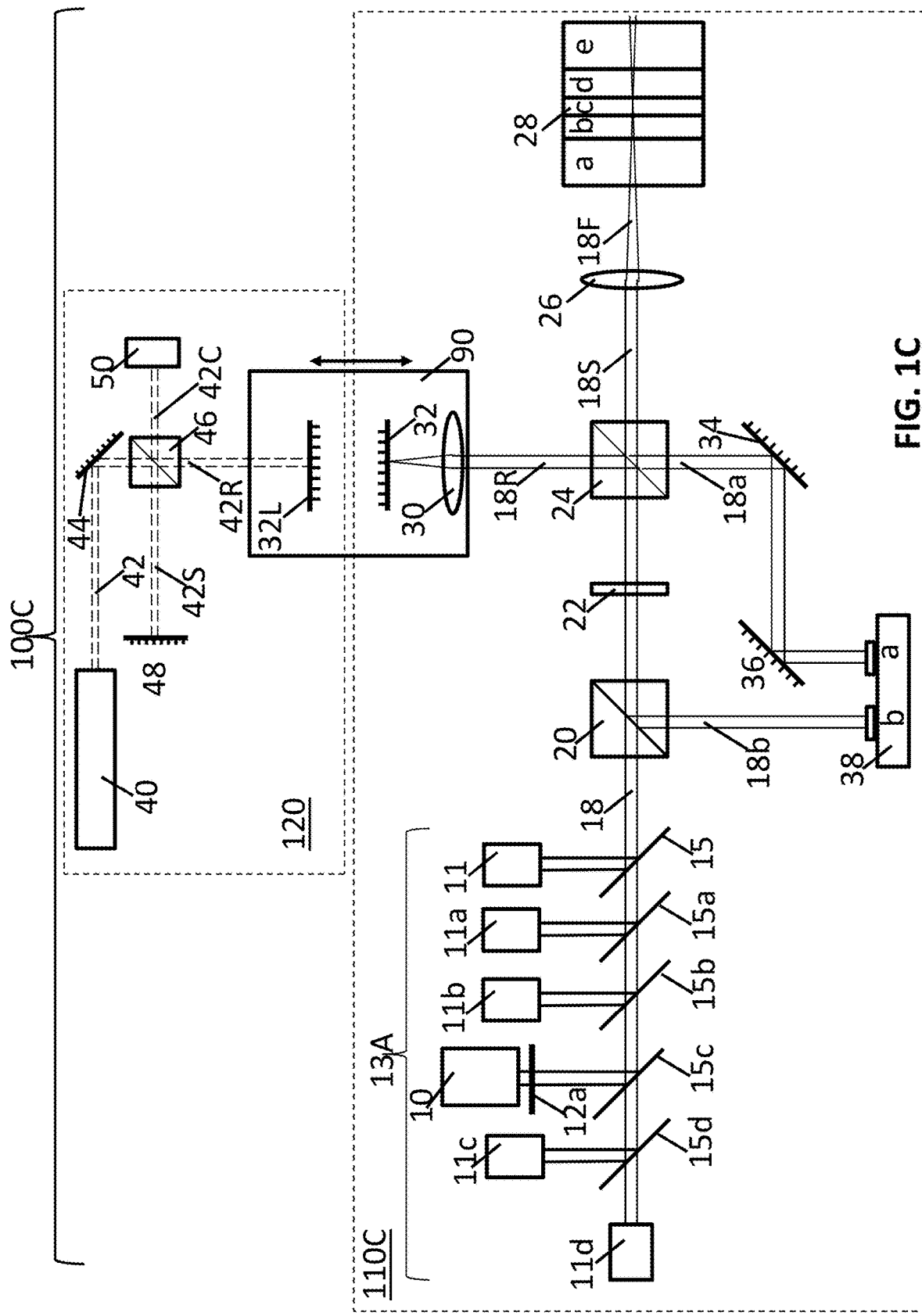
FIG. 1C shows a schematic of a fourth embodiment of an interferometer apparatus used to measure the optical thickness of each of the layers in a multilayer structure as a function of wavelength.

FIG. 1C shows a fourth embodiment of a dual interferometer apparatus 100C used to measure the optical thickness of each of the layers in a multilayer structure 28 as a function of wavelength. The low-coherence interferometer 110 shown in FIG. 1 has been replaced with low-coherence interferometer 110C (contained within the dotted line border) in which the tunable light source 13 has been replaced with a new tunable light source 13A. All other components of interferometer apparatus 100C are the same as in interferometer apparatus 100. The new tunable light source 13A is comprised of multiple individual low-coherence light sources 11, 11a, 11b, 11c, and 11d which output collimated light each having distinct fixed center wavelengths which are combined into the collimated beam 18. The tunable light source 13A may also include a broadband low-coherence light source 10 which also produces a collimated broadband low-coherence light beam. The collimated broadband low-coherence light beam passes through tunable filter 12a to limit its center wavelength to a narrow band. Tunable filter 12a preferably has a fixed set of one or more distinct center wavelength narrow bandpass filters which are selected one at a time to switch the wavelength of light entering the interferometer 110 between a fixed set of distinct center wavelengths. Tunable filter 12a is preferably comprised of a fixed set of narrow bandpass filters mounted on a filter wheel. All of the low-coherence light sources 11, 11a, 11 b, 11c, and 11d and the broadband low-coherence light source 10 can be individually turned on or off and include collimators (not shown) at their outputs. During operation of low-coherence interferometer 110C, light of only one distinct center wavelength is switched on at a time during each set of measurements.

Dichroic mirrors 15, 15a, 15b, 15c and 15d are utilized to combine the light emitting from the respective low-coherence light sources 11, 11a, 11b, 11c, and 11d and the filtered light from broadband low-coherence light source 10 into the single collimated beam 18. As in interferometer 110 of FIG. 1, the collimated light beam 18 passes through polarizing beam splitter (PBS) 20 which linearly polarizes the transmitted collimated light beam. The collimated light beam passing through PBS 20 passes through quarter wave plate 22 which is preferably an achromatic quarter wave plate. The rest of the interferometer 110C functions as described with respect to the discussion of interferometer 110 of FIG. 1.

In a first embodiment of tunable light source 13A, the dichroic mirrors 15, 15a, 15b, 15c and 15d are comprised of long pass dichroic mirrors with monotonically increasing cutoff wavelength, and low-coherence light sources 11, 11a, 11b, 11c, and 11d also are of monotonically increasing center wavelength. Long pass dichroic mirrors are highly reflective below the cutoff wavelength and highly transmissive above it. When using long pass dichroic mirrors, the following wavelength relationships must be met In order to efficiently combine all of the low-coherence light sources into a single collimated beam 18: The center wavelength of the first low-coherence light source 11 must be shorter than the cutoff wavelength of the first dichroic mirror 15. The center wavelength of the second low-coherence light source 11a must be longer than the cutoff wavelength of the first dichroic mirror 15 and shorter than the cutoff wavelength of the second dichroic mirror 15a. The center wavelength of the third low-coherence light source 11b must be longer than the cutoff wavelength of the second dichroic mirror 15a and shorter than the cutoff wavelength of the third dichroic mirror 15b. The center wavelength range of the tunable filter 12a is limited to center wavelengths which are longer than the cutoff wavelength of the third dichroic mirror 15b and shorter than the cutoff wavelength of the fourth dichroic mirror 15c. The center wavelength of the fourth low-coherence light source 11c must be longer than the cutoff wavelength of the fourth dichroic mirror 15c and shorter than the cutoff wavelength of the fifth dichroic mirror 15d. Also the center wavelength of the fifth low-coherence light source 11d must be longer than the cutoff wavelength of the fifth dichroic mirror 15d.

The low-coherence light sources 11, 11a, 11b, 11c and 11d in the tunable light source 13A are preferably comprised of superluminescent diode (SLED) light sources which are pigtailed to single mode optical fibers with fiber collimators attached to the output end of the optical fiber. In an example of the first embodiment of tunable light source 13A, the first, second, third, fourth and fifth low-coherence light sources 11, 11a, 11b, 11c and 11d may be comprised of superluminescent diodes (SLED) having center wavelengths of 405 nm, 450 nm, 495 nm, 790 and 850 nm respectively. Also, the first, second, third, fourth and fifth dichroic mirrors 15, 15a, 15b, 15c, 15d and 15e may be long pass dichroic mirrors with cutoff wavelengths of 425 nm, 475 nm, 510 nm, 770 nm and 820 nm respectively. The broad band low-coherence light source 10 may be a supercontinuum light source such as a YSL Photonics SC5 supercontinuum light source; and tunable filter 12a may be comprised of a filter wheel containing 5 narrow bandpass filters having center wavelengths of 550, nm 600, nm 650 nm, 700 nm and 750 nm.

Although five low-coherence light sources and five dichroic mirrors are shown in the tunable light source 13A in FIG. 1C, it is to be understood that the number of low-coherence light sources and the number of dichroic mirrors shown in the tunable light source 13A can changed together to form alternate embodiments of tunable light source 13A. Other alternate embodiments of the tunable lightsource 13A can also be constructed without having broadband low-coherence light source 10 being present.

In a second embodiment of tunable light source 13A, dichroic mirrors 15, 15a, 15b, 15c and 15d are comprised of short pass dichroic mirrors which are highly reflective above the cutoff wavelength and highly transmissive below it. The short pass dichroic mirrors 15, 15a, 15b, 15c and 15d have monotonically decreasing cutoff wavelength and the low-coherence light sources 11, 11a, 11b, 11c, and 11d also are of monotonically decreasing center wavelength. When using short pass dichroic mirrors the following wavelength relationships must be met In order to efficiently combine all of the low-coherence light sources into a single collimated beam 18: The center wavelength of the first low-coherence light source 11 must be longer than the cutoff wavelength of the first dichroic mirror 15. The center wavelength of the second low-coherence light source 11a must be shorter than the cutoff wavelength of the first dichroic mirror 15 and longer than the cutoff wavelength of the second dichroic mirror 15a. The center wavelength of the third low-coherence light source 11b must be shorter than the cutoff wavelength of the second dichroic mirror 15a and longer than the cutoff wavelength of the third dichroic mirror 15b. The center wavelength range of the tunable filter 12a is limited to center wavelengths which are shorter than the cutoff wavelength of the third dichroic mirror 15b and longer than the cutoff wavelength of the fourth dichroic mirror 15c. The center wavelength of the fourth low-coherence light source 11c must be shorter than the cutoff wavelength of the fourth dichroic mirror 15c and longer than the cutoff wavelength of the fifth dichroic mirror 15d. Also, the center wavelength of the fifth low-coherence light source 11d must be shorter than the cutoff wavelength of the fifth dichroic mirror 15d.

Figure 1D:
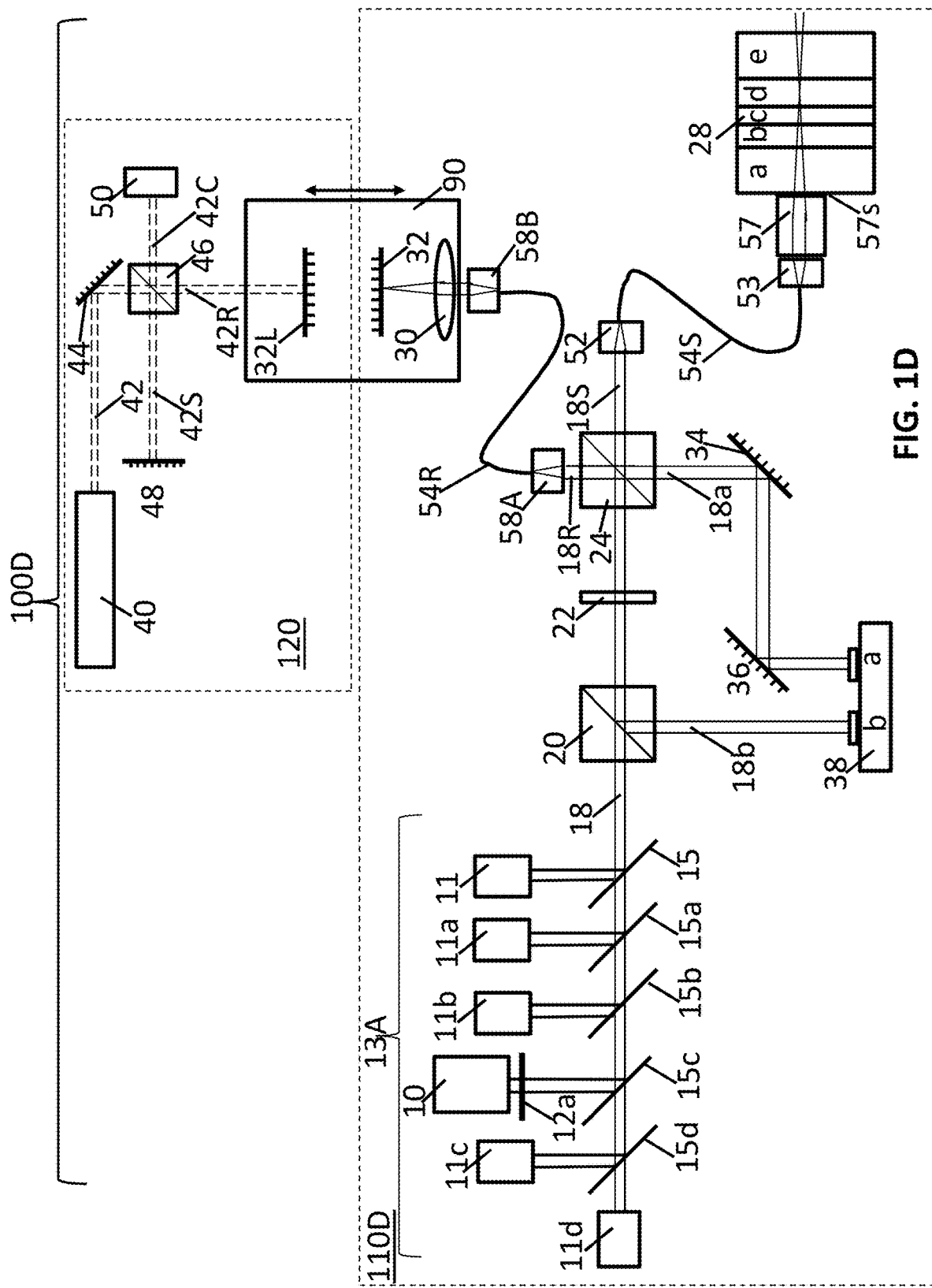
FIG. 1D shows a schematic of a fifth embodiment of an interferometer apparatus used to measure the optical thickness of each of the layers in a multilayer structure as a function of wavelength.

FIG. 1D shows a fifth embodiment of the interferometer apparatus 100D used to measure the optical thickness of each of the layers in a multilayer structure 28 as a function of wavelength. Most of the components are the same as that of interferometer apparatus 100B shown in FIG. 1B with the exception that the low-coherence interferometer 110D incorporates tunable light source 13A as described with reference to FIG. 1C, and the optical probe 56 of low-coherence interferometer 110B is now shown to include a fiber collimator 53 coupled to a portable optical probe 57. The portable optical probe also has a probe mounting surface 57S which usually includes a three-point mount for automatically aligning the probe 57 to the top surface of the multilayer structure 28 being measured. The length of the sample arm optical fiber 54S is set in order to place the front end of the mounting surface 57S of the portable optical probe at the location of the start of the measurement region of the interferometer. The portable optical probe could be handheld at the surface or set in place. Fiber collimators 52, 53, 58A and 58B are preferably off axis parabolic mirror achromatic collimators such as ThorLabs connectorized protected silver reflective collimators. As with the configuration shown in FIG. 1B, the sample arm optical fiber 54S and reference arm optical fiber 54R are preferably photonic crystal fibers (PCF) which remain single mode over the entire wavelength range of tunable light source 13A, and of matched path length in order to minimize dispersion effects in the low-coherence interferometer.

Figure 1E:
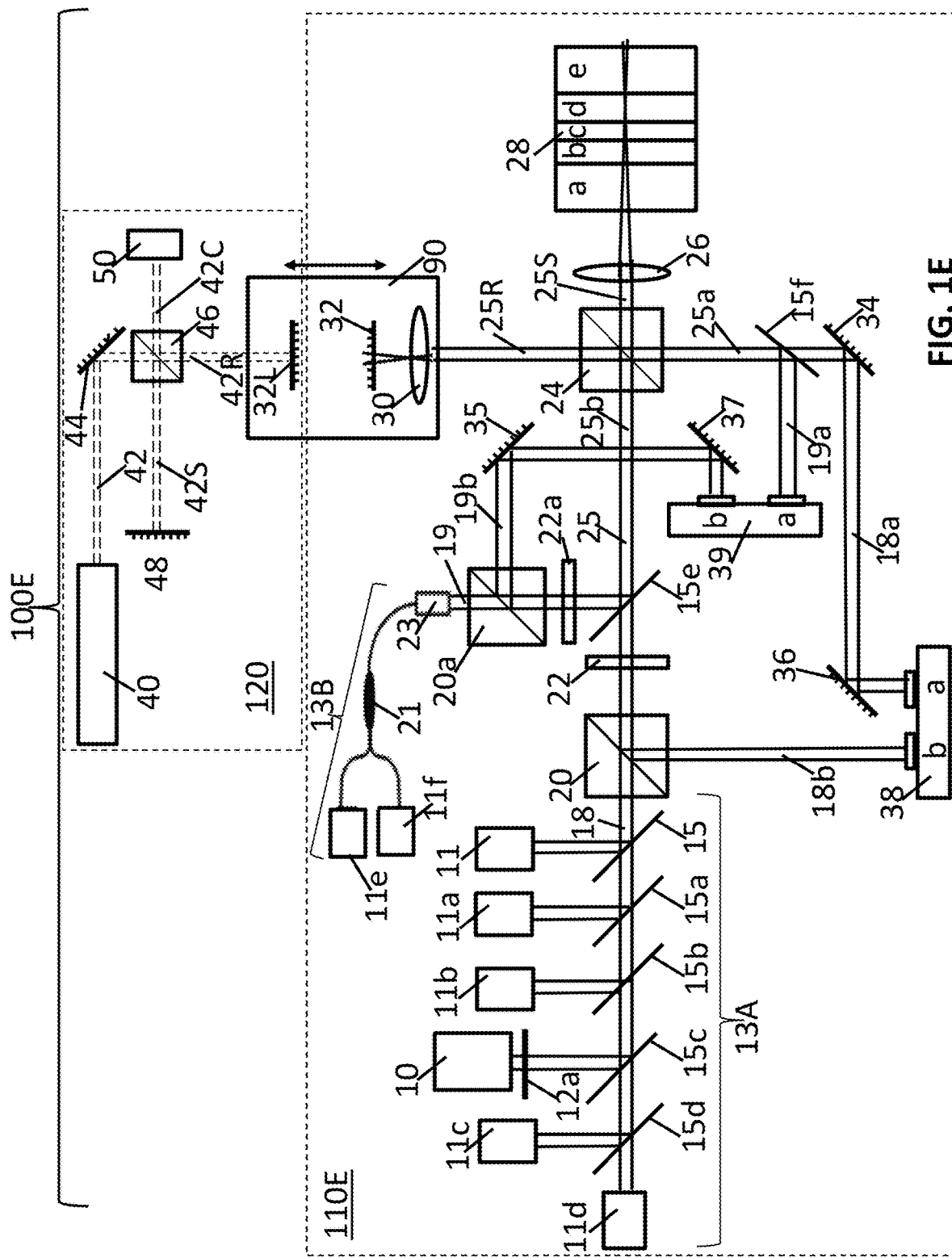
FIG. 1E shows a schematic of a sixth embodiment of an interferometer apparatus used to measure the optical thickness of each of the layers in a multilayer structure as a function of wavelength

FIG. 1E shows a sixth embodiment of the interferometer apparatus 100E used to measure the optical thickness of each of the layers in a multilayer structure 28 as a function of wavelength. In addition to the first balanced detector 38 which detects interfering light in a first wavelength region of the optical spectrum, the low-coherence interferometer 110E of interferometer apparatus 100E includes a second balanced detector 39 which detects interfering light in a second wavelength region of the optical spectrum. The low-coherence tunable light source in this embodiment includes a new second section 13B in addition to the tunable light source 13A (first section). All of the individual light sources in the low-coherence tunable light source first section 13A emit light with center wavelengths within a first wavelength region of the optical spectrum, and all of light sources in the low-coherence tunable light source second section 13B emit light with center wavelengths within a second wavelength region of the optical spectrum. As with the tunable light source first section 13A, the low-coherence tunable light source second section 13B can be comprised of multiple low-coherence light sources having different center wavelengths and may also include a broadband low-coherence light source with its own tunable filter. All of the individual light sources making up the low coherence tunable light source second section 13B can be turned on or off individually and only one center wavelength is turned on at a time during each set of measurements.

In the embodiment shown in FIG. 1E, optical interference at wavelengths emitted by tunable light source 13A is detected by the first balanced detector 38, and optical interference at wavelengths emitted by the second tunable light source 13B is detected by the second balanced detector 39, thus allowing simultaneous measurement of optical interference from light of one center wavelength emitted by tunable light source 13A while measuring optical interference from light of one center wavelength emitted by tunable light source 13B. First and second balanced detectors 38 and 39 preferably are comprised of silicon (Si) and indium gallium arsenide (InGaAs) detectors respectively. Si detectors can be used to measure light having wavelengths from 320-1060 nm while InGaAs detectors can be used to measure light having wavelengths from 800-1700 nm.

In FIG. 1E, the example second tunable light source 13B is shown to be comprised of sixth and seventh low-coherence light sources 11e and 11f, a wavelength division multiplexer (WDM) 21 and a fiber collimator 23. Sixth and seventh low-coherence light sources 11e and 11f have distinct fixed center wavelengths which are in the second spectral region of the optical spectrum. The light emitted from low-coherence light sources 11e and 11f is combined into a single beam using the fiber optic wavelength division multiplexer (WDM) 21. The sixth and seventh low-coherence light sources 11e and 11f are preferably 1310 nm and 1550 nm SLEDs. The combined beam traveling down the output fiber of WDM 21 is collimated at the fiber collimator 23 to form second collimated beam 19. The second collimated beam 19 passes through a second polarizing beam splitter (PBS) 20a to linearly polarize the transmitted collimated light beam 19. The transmitted collimated linearly polarized light beam 19 then passes through a second quarter wave plate (QWP) 22a and is reflected at a sixth dichroic mirror 15e where it is combined with collimated beam 18 to form the combined collimated beam 25. The sixth dichroic mirror 15e is preferably a short pass dichroic mirror which has a cutoff wavelength longer than the longest center wavelength which the tunable light source 13A is tuned to and shorter than the shortest center wavelength that the second tunable light source 13B is tuned to. As an example, the short pass dichroic mirror 15e may have a cutoff wavelength in the range 870-1280 nm when the light sources comprising tunable light source 13A are those given in the example of the first embodiment of tunable light source 13A and the sixth and seventh low-coherence light sources 11e and 11f are 1310 nm and 1550 nm SLEDs. The combined collimated beam 25 is input into the beam splitter (BS) 24 which forms the Michelson interferometer. The beam splitter 24 splits the input combined collimated beam 25 into a sample arm combined collimated beam 25S and a reference arm combined collimated beam 25R that travel through the sample and reference arms of the Michelson interferometer respectively.

The sample arm combined collimated beam 25S and the reference arm combined collimated beam 25R shown in low-coherence interferometer 110E shown in FIG. 1E interact with the sample and reference arms of the low-coherence interferometer in the same way as described with reference to the discussion of FIG. 1. The light portion of the reference arm combined collimated beam 25R being reflected from the reference mirror 32 and the light portion of the sample arm combined collimated beam 25S being reflected off of each optical interface of the multilayer structure 28 are recombined at the beam splitter 24 and split again into a first combined low-coherence interference beam 25a and a second combined low-coherence interference beam 25b. The first combined low-coherence interference beam 25a is incident on a seventh dichroic mirror 15f which preferably is a low pass dichroic mirror having the same cutoff wavelength as the sixth dichroic mirror 15e. Light at wavelengths longer than the cutoff wavelength of the seventh dichroic mirror 15f is reflected at dichroic mirror 15f forming the first part of the second low-coherence interference beam 19a and is incident on the first detector 39a of the second balanced detector 39. The shorter wavelength portion called the first part of the low-coherence interference beam 18a is transmitted through dichroic mirror 15f and is made to be incident on the first detector 38a of balanced detector 38 after reflecting off the pair of 45° mirrors 34 and 36.

The second combined low-coherence interference beam 25b travels back through the sixth dichroic mirror 15e which again separates the longer wavelength portion of the second low-coherence interference beam 25b from the shorter wavelength portion of the interfering light. The longer wavelength portion called the second part of the second low-coherence interference beam 19b is reflected at dichroic mirror 15e and passes back through the second quarter wave plate 22a and into the second polarizing beam splitter 20a where it is reflected and is made to be incident on the second detector 39b of balanced detector 39 after being reflected by a pair of 45° mirrors 35 and 37. The shorter wavelength portion called the second part of the low-coherence interference beam 18b is transmitted through dichroic mirror 15e and back through quarter wave plate 22 and is incident on the polarizing beam splitter 20 where it is reflected and is made to be incident on a second detector 38b of the balanced detector 38.

Figure 1F:
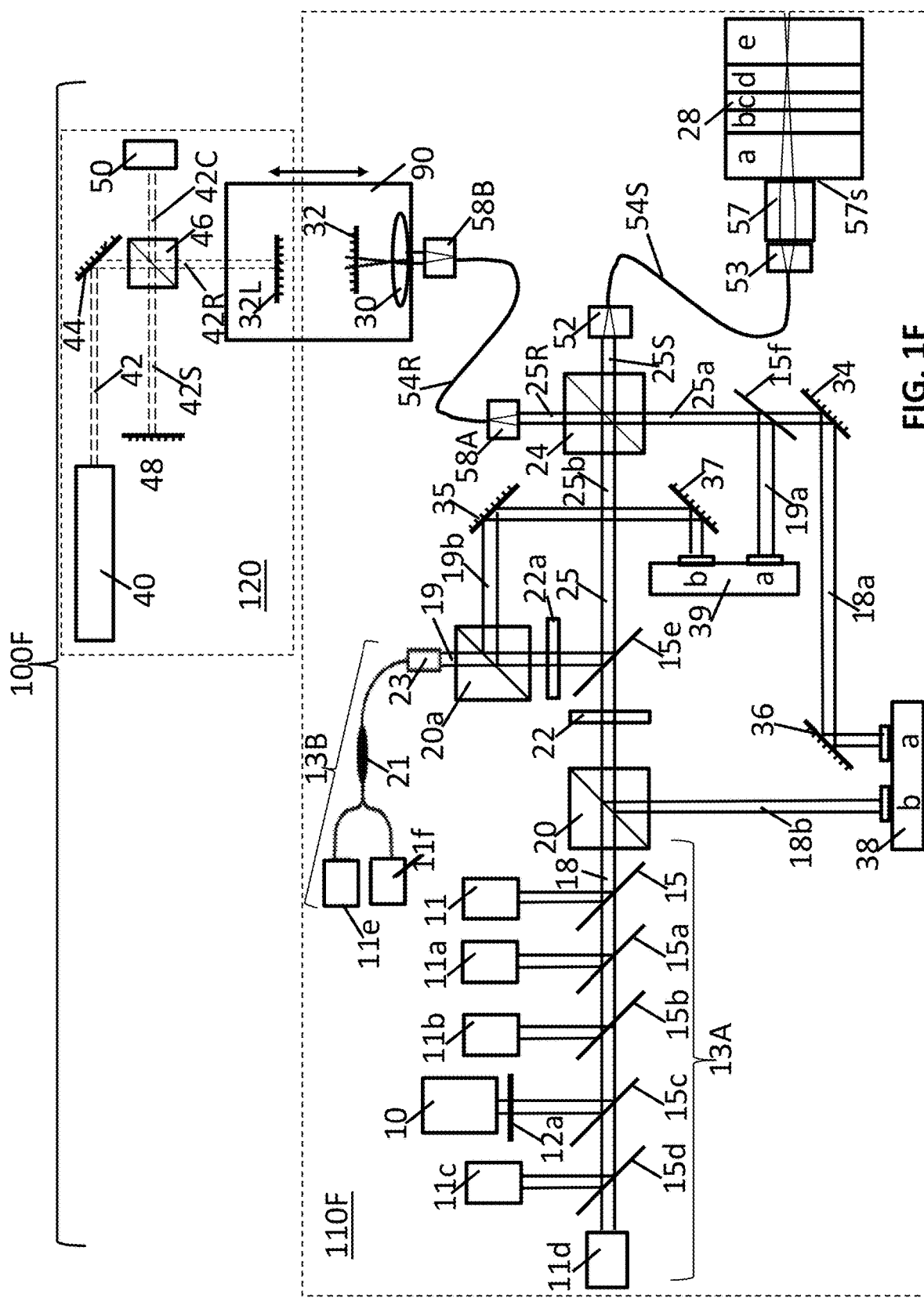
FIG. 1F shows a schematic of a seventh embodiment of an interferometer apparatus used to measure the optical thickness of each of the layers in a multilayer structure as a function of wavelength.

FIG. 1F shows a seventh embodiment of the interferometer apparatus 100F used to measure the optical thickness of each of the layers in a multilayer structure 28 as a function of wavelength which includes a portable or handheld optical probe interface to the structure under test. Most of the components are the same as that of interferometer apparatus 100E shown in FIG. 1E with the exception that the low-coherence interferometer 110F incorporates all of the components shown in the sample and reference arms of the Michelson interferometer shown in FIG. 1D. The sample arm now includes the handheld or portable optical probe 57 coupled to the instrument via a sample arm optical fiber 54S, and the reference arm now includes a reference arm optical fiber 54R which preferably has the same length as sample arm optical fiber 54S. As with the configuration shown in FIG. 1D, the sample arm optical fiber 54S and reference arm optical fiber 54R are preferably photonic crystal fibers (PCF) which remain single mode over the entire wavelength range of tunable light source first section 13A and tunable light source second section 13B. It is also usual practice to match the optical path lengths of the sample and reference arm optical fibers 54S and 54R in order to minimize dispersion effects in the low-coherence interferometer.

As with the low-coherence light sources 11, 11a, 11 b, 11c, and 11d, and the broadband low-coherence light source 10 in tunable light source 13A, light sources 11e and 11f can be individually turned on or off, and only one of them is turned on at any given time during measurements. Since the interferometers 100E and 100F contain two balanced detectors, two wavelengths from the set of k distinct center wavelengths can be measured simultaneously. One center wavelength from tunable light source 13A can be measured simultaneously with a measurement made using light source 11e or 11f. Interfering light from any one of the fixed wavelength light sources of tunable light source 13A can be measured using balanced detector 38 simultaneously with the measurement of interfering light from light sources 11e or 11f using the second balanced detector 39.

Although two low-coherence light sources 11e and 11f are shown to be detected by the second balanced detector 39, more low coherence light sources can be added which emit light in the second wavelength region of the optical spectrum, and then combined together using collimators and dichroic filters as described with reference to the discussion of tunable light source 13A. Other embodiments could also include a broadband low coherence light source that operates in the second wavelength region of the optical spectrum with a tunable filter containing a discrete set of narrow bandpass filters having distinct center wavelengths in the second wavelength region of the optical spectrum, which are combined with the low coherence light sources such as 11e and 11f.

The laser interferometer 120 shown at the upper portion of FIG. 1, FIG. 1A, FIG. 1B, FIG. 1C, FIG. 1D, FIG. 1E, and FIG. 1F is the same in all of the interferometer configurations 100, 100A, 100B, 100C, 100D, 100E and 100F. A collimated light beam 42 is emitted from a laser 40, preferably a 632 nm HeNe laser. The collimated light beam 42 is incident on a 45° mounted mirror 44 and is incident on a beamsplitter 46, preferably a 50/50 beamsplitter cube. The beam splitter 46 splits the collimated laser beam 42 into sample and reference collimated laser beams 42S and 42R that are incident on stationary mirror 48 and laser reference mirror 32L respectively. Collimated laser light reflecting back from the laser reference mirror 32L and the stationary mirror 48 are recombined at the beam splitter 46 and the resulting laser interference beam 42C is incident on a detector 50. As described above, the laser reference mirror 32L is co-mounted with the reference arm lens 30 and reference mirror 32 of low-coherence interferometer 110 on the variable optical path delay element 90. This causes the low-coherence interferometer and the coherent light interferometer to be coupled so that the optical path difference between the two arms in each of the respective interferometers changes by the same amount as a function of travel of the variable optical path delay element 90. In a preferred embodiment, reference mirror 30 and laser reference mirror 32L are comprised of the front and back surfaces of a single optically flat dual sided mirror. The laser interferometer 120 acts as a reference interferometer which is used to accurately track the optical path difference between the two arms in the low-coherence interferometer 110.

Figure 2:
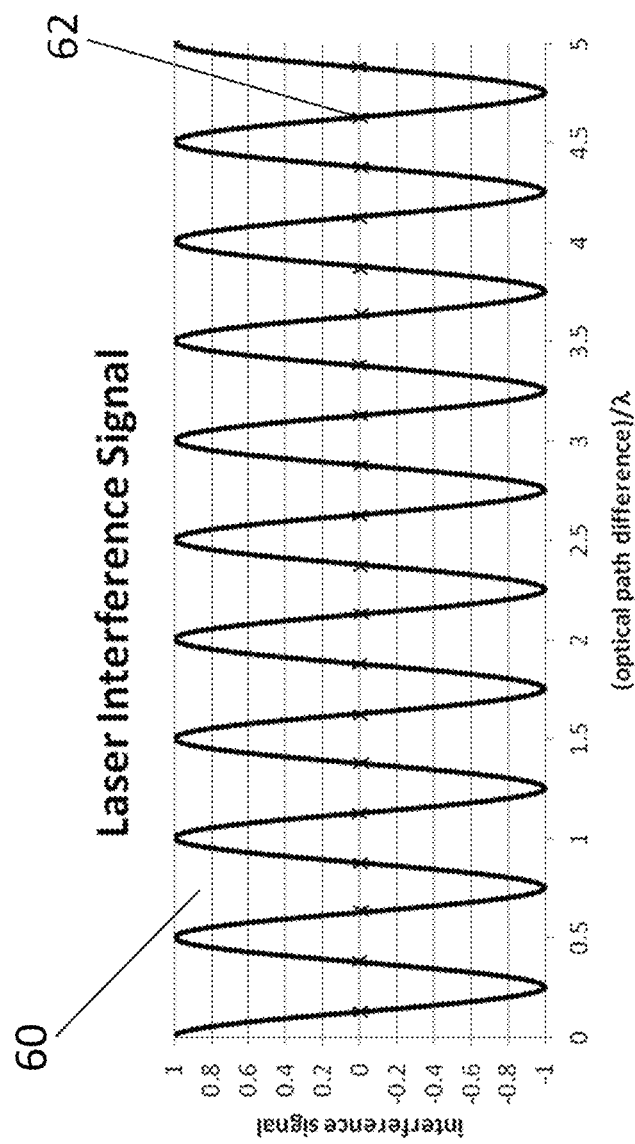
FIG. 2 shows a laser interferometer signal as a function of optical path length difference between the sample and reference arms in the interferometer.

During operation of dual interferometer apparatus 100, 100A, 100B, 100C, 100D, 100E or 100F, the variable optical path delay element 90 is repetitively scanned at nearly constant velocity from a start position to an end position followed by scanning from the end position to the start position. The variable optical path delay element is typically actuated with a trapezoidal profile in which there is an acceleration phase, a constant velocity phase to within ±10% and a deceleration phase. Since the laser 40 has a very long coherence length, constructive interference occurs in the laser interferometer 120 whenever the difference in the path length between the stationary reference arm and the moving arm differ by $m\lambda/2$ where m is an integer and $\lambda$ is the wavelength of the laser light source, as shown in FIG. 2. FIG. 2 shows an example laser interferometer signal 60 as a function of optical path difference between the two arms of the interferometer normalized to the wavelength $\lambda$ of the laser. The optical path difference from the start of each scan and velocity of the laser and low-coherence interferometers are the same at all times. Locations of the zero crossings 62 of the laser interferometer signal 60 measured with detector 50 as shown in FIG. 2 can be used as a distance scale to trigger data acquisition of the low-coherence interferometer balanced detector (BD) signal at known distance intervals. Locations of the maxima and minima of the laser interference signal 60 can also be used as the distance scale. Thus, the reference interferometer is used to accurately track the location of the variable optical path delay element as it is repetitively scanned.

Figure 3:
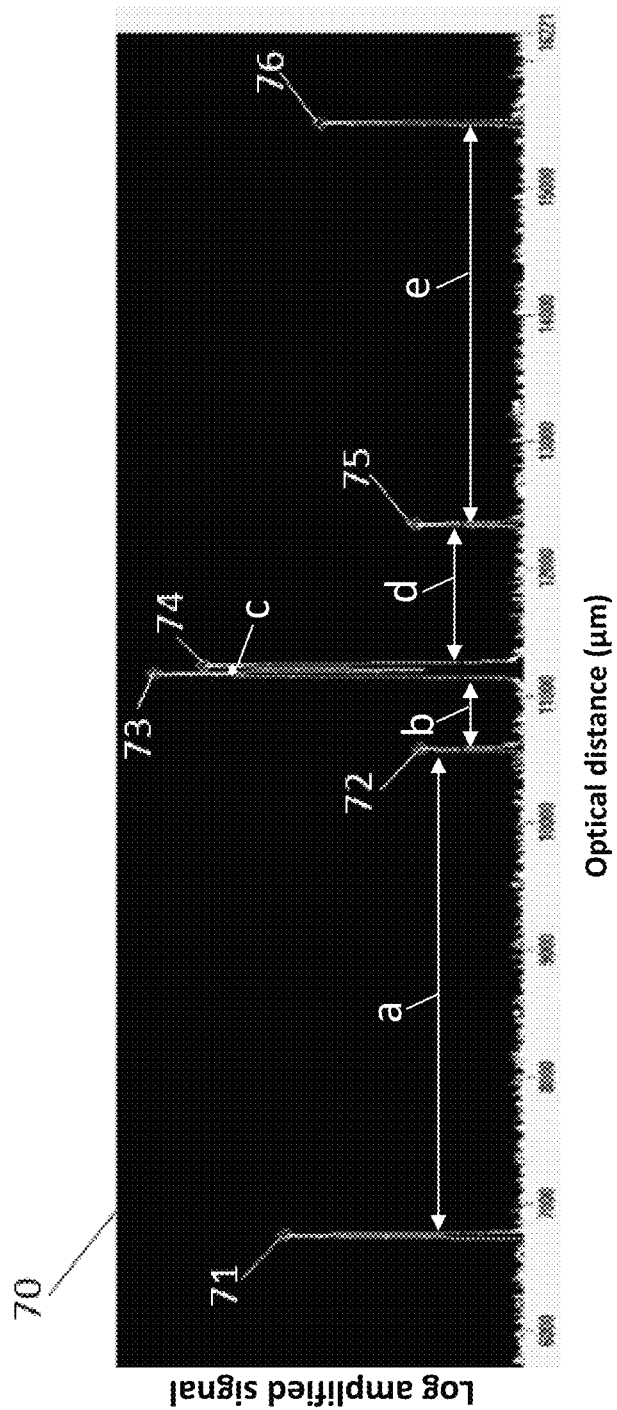
FIG. 3 shows an example low-coherence interferometer scan as a function of optical scan distance of the reference arm of the interferometer.

Constructive interference occurs in the low-coherence interferometer 110 when the optical path length from the beam splitter 24 to the reference mirror 32 is equal in length to the optical path length from the beam splitter 24 to an optical interface of the multilayer structure 28 within a few coherence lengths of the low-coherence light source 10, which is typically on the order of 5-25 μm. In order to be able to observe all of the optical interfaces in the multilayer structure 28, the variable optical path delay element 90 must travel a distance greater than the total optical path in the multilayer structure 28. Also, the optical path length from the beam splitter 24 to the reference mirror 32 at the start position of the reference mirror 32 is required to be less than the optical path length from the beam splitter 24 to the first optical interface (air/28a) in the multilayer structure 28 and the optical path length from the beam splitter 24 to the reference mirror 32 at the end position of the reference mirror 32 is required to be greater than the optical path length from the beam splitter 24 to the last optical interface (28e/air) in the multilayer structure 28. As the variable optical path delay element 90 is moved from its start position to its end position all of the optical interfaces in the multilayer structure will be observed, an example of which is shown in FIG. 3. In addition, when the variable optical path delay element 90 is scanned from its end position to its start position all of the optical interfaces in the sample will be observed in reverse order. The distance between the start position and the end position is larger than the total optical thickness of the m layer multilayer structure.

During operation of dual interferometer apparatus 100, 100A, 100B, 100C, 100D, 100E or 100F the measured signals of balanced detector 38 and balanced detector 39 (in apparatus 100E and 100F) are filtered and log amplified, and the envelope of the log amplified low-coherence interferometer signals are digitized using a high-speed data acquisition card, displayed on a monitor and stored in a computer as a function of distance traveled by the variable optical path delay element 90 during measurement. The locations of the peaks in the amplified low-coherence envelope signal as a function of distance define the locations of the optical interfaces in the multilayer structure being measured. The amplified low-coherence envelope signal is analyzed with a computer in order to determine the true peak locations of the optical interfaces with respect to the start of scan location. Multiple scans are performed at each of the k measurement wavelengths and files containing the locations of all the observed optical interfaces at each of the k measured wavelengths are recorded.

The computer also has a data base of known material group index of refraction dispersion curves stored in memory, and all calculations are done with the computer. The computer is operable to execute an algorithm, which is used to determine the number of layers m in the multilayer structure, to determine which of the m layers have a best fit material in a reference database of known material group index of refraction dispersion curves which include data measured at the same set of k distinct center wavelengths, and to identify the material composition and thickness of the layers which have a best fit material in the reference database.

FIG. 3 shows an example low-coherence interferometer scan 70 (also called an interferogram) as a function of optical scan distance of the variable optical path delay element 90 showing the locations of all of the optical interfaces in an exemplary 5-layer multilayer structure 28 using the filtered low-coherence light source centered at 650 nm. The log amplified signal coming from the balanced detector 38 is shown as a function of optical distance referenced from the location of the start of the scan. The optical scan distance is calculated from the measured laser interferometer signal. Peaks 71, 72, 73, 74, 75 and 76 are observed at the locations of each optical interface in the multilayer structure 28 and correspond to the air/28a, 28a/28b, 28b/28c, 28c/28d, 28d/28e and 28e/air interfaces respectively. In the 5-layer structure, there are 6 optical interfaces and in general for a m layer multilayer structure there are m+1 optical interfaces including the top and bottom air interfaces of the multilayer structure. The distances between successive optical interfaces shown by letters a, b, c, d and e correspond to the optical thickness of each of the layers 28a, 28b, 28c, 28d and 28e respectively. Since the low-coherence interferometer data is sampled at known distance intervals, peak location algorithms can be applied to find the true locations of all of the peaks in the low-coherence interferometer data. For example, when using a low-coherence source that has a Gaussian wavelength profile, the amplified signal also has a Gaussian envelope and with log amplification the signal at each peak looks like a quadratic function. Multiple measured points around the peak could then be fit to a quadratic function to find the true location of the peak. Multiple scans are averaged and statistics for measurement reproducibility are obtained. TABLE 1 shows the measured optical thickness for each of the 5 layers of the multilayer structure measured in FIG. 3 along with its standard deviation for 100 repeat measurements.

TABLE 1

650 nm optical thickness and standard deviation for a 5-layer structure.

| Layer # | Optical Thickness (μm) | Standard Deviation (μm) |
| --- | --- | --- |
| 1 | 3857.52 | 0.16 |
| 2 | 500.94 | 0.17 |
| 3 | 62.60 | 0.06 |
| 4 | 1112.14 | 0.20 |
| 5 | 3162.65 | 0.19 |

When measuring a multilayer structure, the multilayer structure 28 is mounted in front of and normal to the lens 26 shown in FIG. 1, FIG. 1C and FIG. 1E, or optical probe 56 shown in FIG. 1A, or FIG. 1B, or optical probe 57 shown in FIG. 1D and FIG. 1F. This allows the low-coherence incident light to be focused inside the multilayer structure and to maximize the magnitude of the light reflected back from each optical interface of the multilayer structure 28. A sequence of measurements is performed at the same location in the multilayer structure 28 having m layers to measure the optical thickness of each of the m layers in the multilayer structure as a function of wavelength. Multiple scans are measured at each wavelength and averaged. When using interferometer configurations 100, 100A and 100B, the sequence of measurements is performed by setting the tunable filter 12 to transmit light of a first center wavelength $\lambda_1$ followed by changing the center wavelength range of the tunable filter 12 by known increments, preferably in the range of 5-10 nm wavelength intervals over the entire wavelength range of the measurements which is preferably over the range of 400-840 nm for many materials. As an example, if we select 5 nm wavelength intervals throughout the wavelength range of 400-840 nm there will be 89 distinct wavelengths chosen for measurement. Alternatively a fixed set of k distinct center wavelengths can be chosen for measurement. We use the convention that the shortest center wavelength for the filtered light source is $\lambda_1$ and the longest wavelength used for the filtered light source is $\lambda_k$ where k is the number of different wavelengths used to measure the optical thicknesses of each of the layers in the multilayer structure. For each center wavelength $\lambda_j$ of the tunable filter 12, where j=1 to k, the resultant measured optical thicknesses are $[n_{g1}(\lambda_j)t_1]$, $[n_{g2}(\lambda_j)t_2]$, ... $[n_{gm}(\lambda_j)t_m]$ for each of the m layers in the multilayer structure 28. The center wavelength for each successive $\lambda_j$ is longer than $\lambda_{j-1}$. When using the interferometer configurations 100C, 100D, 100E and 100F, the fixed set of k distinct center wavelengths are determined by the makeup of tunable light source 13A and 13B.

The measured optical thicknesses of each layer include the physical thicknesses $t_1, t_2 \ldots t_m$ of each of the m layers in the multilayer structure 28, which are independent of each other, and the measurements at each measurement wavelength $\lambda_j$ are performed without moving the sample. The physical thicknesses $t_1, t_2 \ldots t_m$ do not change with the measurement center wavelength of the light source $\lambda_j$. This allows us to select one center measurement wavelength as a reference wavelength which we call $\lambda_O$, and we can calculate the ratio of measured optical thickness at each measurement wavelength to that measured at the selected reference wavelength $\lambda_O$. Since the same layer physical thickness appears in the numerator and the denominator, the ratio of optical thickness ratio at wavelength $\lambda_j$ for the ith layer is equal to the normalized group index of refraction $\overline{n_{gi}}(\lambda_j)$ of the ith layer where i=1 to m is given by the relationship $$\overline{n_{gi}}(\lambda_j) = \frac{[n_{gi}(\lambda_j)t_i]}{[n_{gi}(\lambda_o)t_i]} = \frac{[n_{gi}(\lambda_j)]}{[n_{gi}(\lambda_o)]}. \tag{1}$$

The wavelength dependence of the normalized group index of refraction $\overline{n_{gi}}(\lambda_j)$ for each of the m layers of the multilayer structure as a function of wavelength $\lambda_j$, where j=1 to k defines the normalized group index of refraction dispersion curve of the material in the ith layer over the wavelength range of the measurement.

We have found that both the group index of refraction dispersion curve and the normalized group index of refraction dispersion curves are unique for most materials as described in detail below. Thus, the shape of the measured group index of refraction dispersion curves and normalized group index of refraction dispersion curves for each of the m layers can be used to identify the material composition of each of the layers. Material identification can be done by comparing the measured group index of refraction dispersion curves or the normalized group index of refraction dispersion curves at the measured center wavelengths $\lambda_j$ where j=1 to k to those found in a material database of reference materials with known group index of refraction dispersion curves or normalized group index of refraction dispersion curves with data points at the same set of center wavelengths and performing a statistical best fit analysis. The normalized group index of refraction dispersion curves for the materials in the database of known materials is derived from the group index of refraction dispersion curve database as shown in Equation 1.

The reference database of known materials is required to include the group index of refraction dispersion curves for all materials in the database to enable determination of physical thickness from measured optical thickness measurements. Once the material is identified from its known group index of refraction dispersion curve or its known normalized group index of refraction dispersion curve, we can then look up its group index of refraction dispersion curve at each of the measured center wavelengths $\lambda_j$ and calculate the layer physical thickness by dividing the measured optical thickness data by the group index of refraction for the material at each measured wavelength $\lambda_j$.

Figures 7A, 7B:
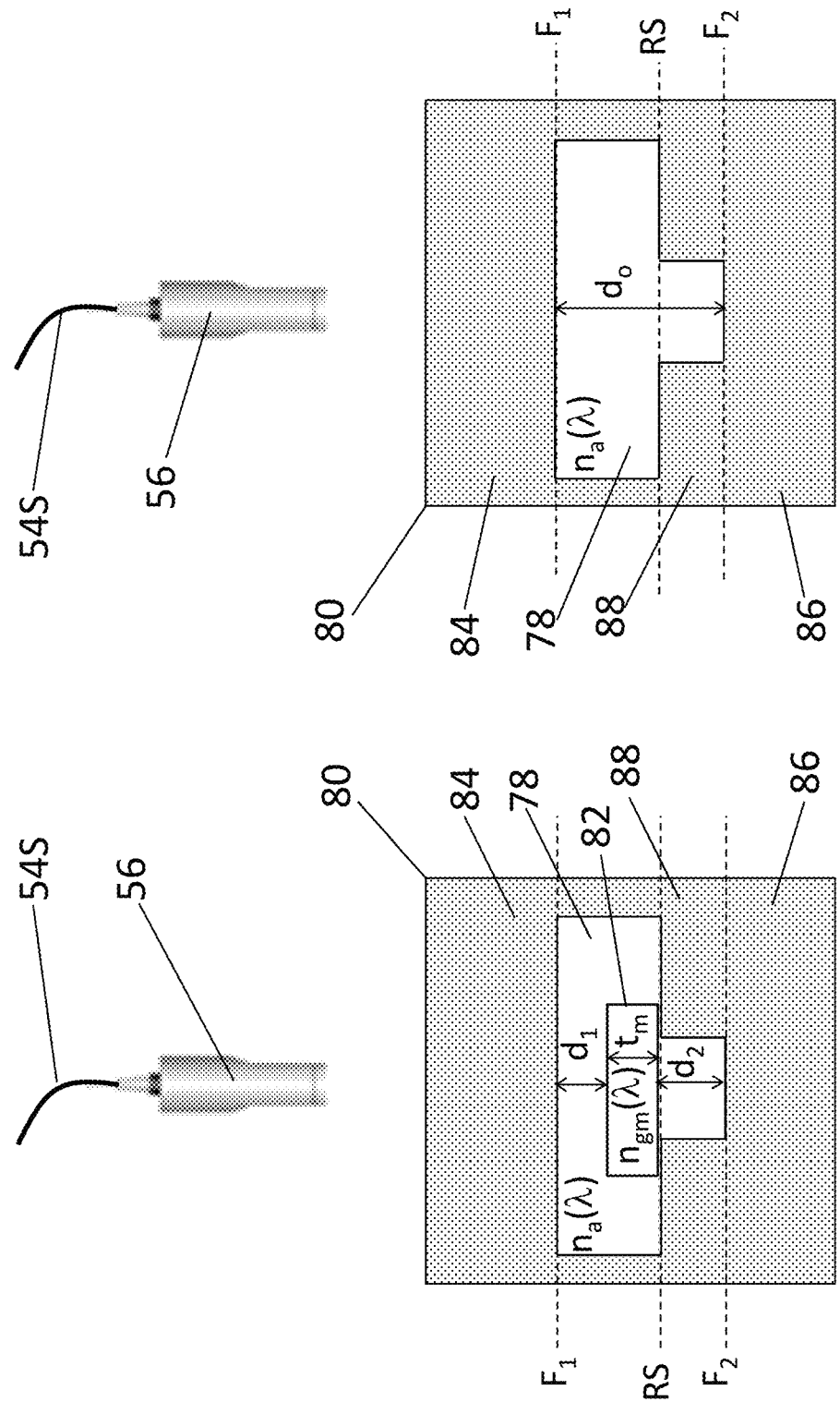
FIG. 7A shows an embodiment of an index of refraction measurement cell containing a single layer of a material to be added to the reference database of known materials.
FIG. 7B shows the index of refraction measurement cell shown in FIG. 7A without the layer of material being present.

There are two methods of getting data from different materials into the group index of refraction database of known materials or the normalized group index of refraction database of known materials using a reference wavelength $\lambda_o$. The first method uses published databases of phase refractive index data versus wavelength and then calculates the group index of refraction and normalized group index of refraction dispersion curves from the published data and equations. The second method uses a group index of refraction cell attached to the measurement apparatus used in the practice of this invention, an embodiment of which is shown in FIGS. 7A and 7B. These two methods are described below.

Figure 4:
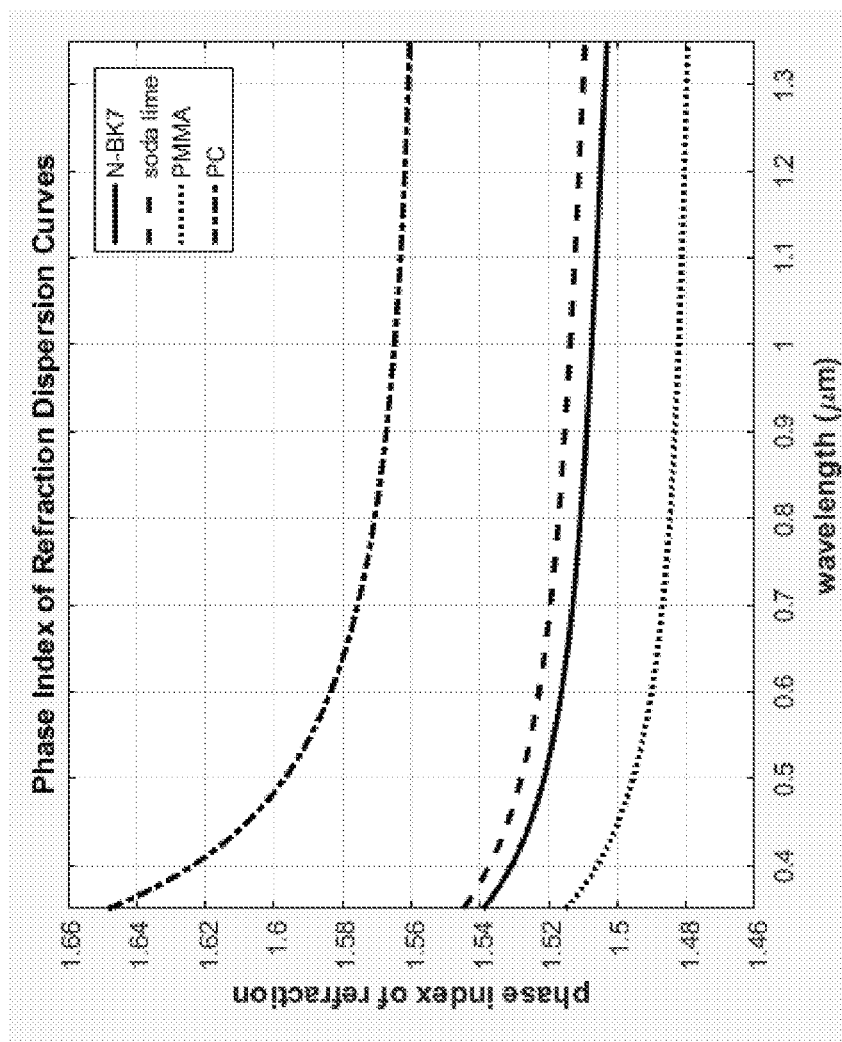
FIG. 4 shows phase index of refraction dispersion curves for some different materials.

The phase index of refraction is related to the property of optical dispersion. The phase index of refraction dispersion curve has been found to be unique for most optical materials. Instruments for measuring the wavelength dependence of the phase index of refraction which is called a dispersion curve include spectral ellipsometers, spectral goniometers and refractometers. A published database of the phase index of refraction dispersion curves for various materials can be found at M. N. Polyanskiy, "Refractive Index Database", https://refractiveindex.info (subsequently herein "Polyanskiy"). Optical dispersion in optical materials is the phenomenon in which the phase velocity $v_p(\lambda)$ of a wave depends on the wavelength of light $\lambda$ traveling through the optical material. The phase index of refraction $n_p(\lambda)$ of a material is defined as $$n_p(\lambda) = \frac{c}{v_p(\lambda)} \tag{2}$$

where c is the speed of light in vacuum and $v_p(\lambda)$ is the phase velocity. A plot of index of refraction as a function of wavelength is called a dispersion curve. FIG. 4 shows example phase index of refraction versus wavelength data for some example materials including soda lime glass, Schott N-BK7 borosilicate glass, poly(methyl methacrylate) PMMA and polycarbonate (PC) based on the Sellmeier equation from Polyanskiy for each of these materials.

Figure 5:
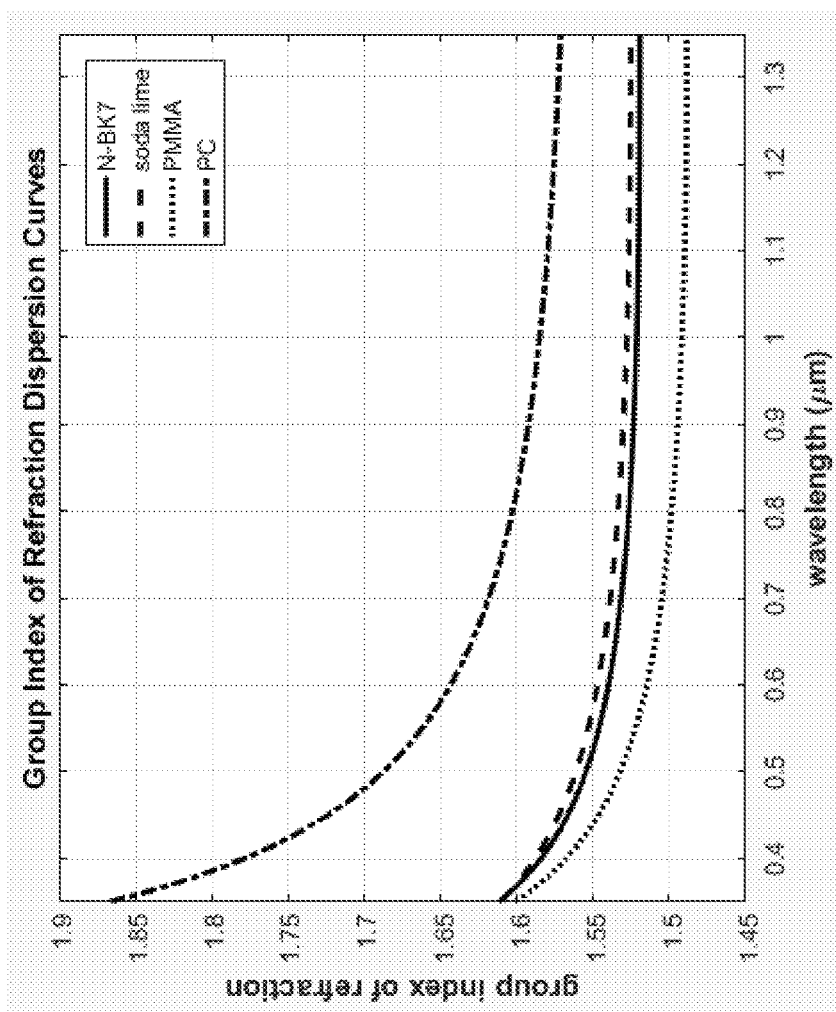
FIG. 5 shows group index of refraction dispersion curves for some different materials.
Figure 6B:
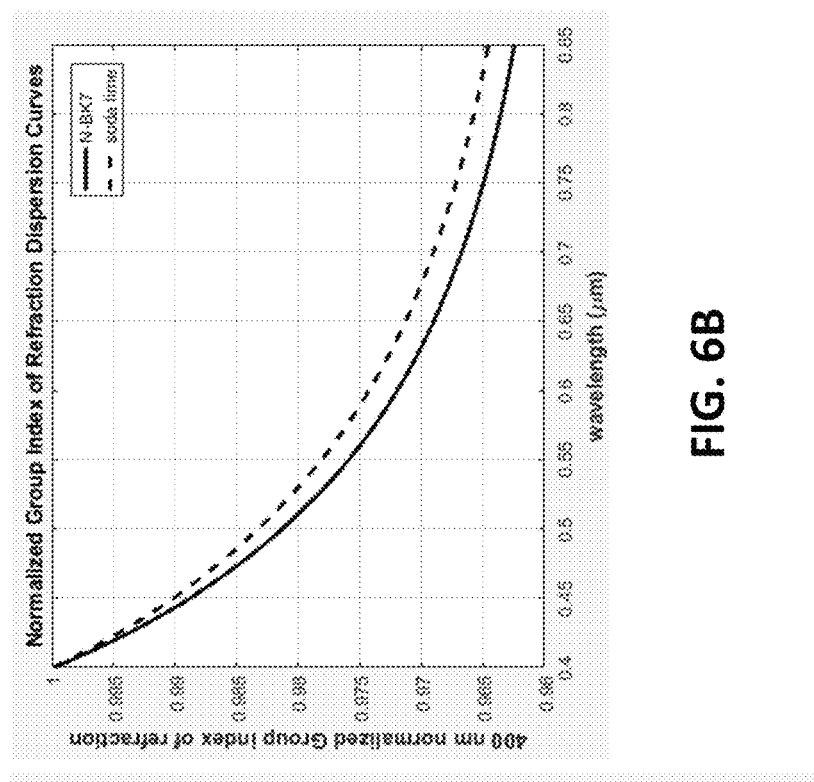
FIG. 6B shows an expanded region of the normalized group index of refraction dispersion curves for two of the materials shown in FIG. 6A.
Figure 6A:
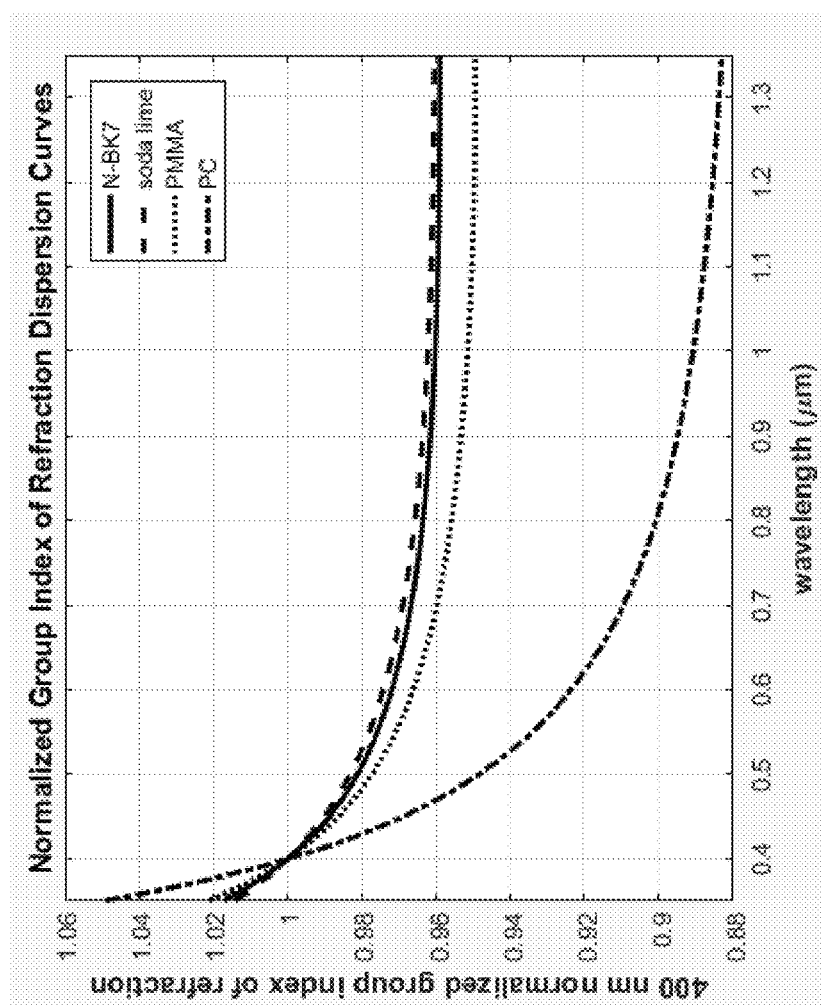
FIG. 6A shows normalized group index of refraction dispersion curves for some materials.

The group index of refraction of a material is related to the phase index of refraction by the relationship $$n_g(\lambda) = n_p(\lambda) - \lambda \frac{dn_p(\lambda)}{d\lambda} \tag{3}$$

where $n_g(\lambda)$ is the group index of refraction and $dn_p(\lambda)/d\lambda$ is the derivative of the phase index of refraction as a function of wavelength $\lambda$. FIG. 5 shows the calculated group index of refraction dispersion curve for the same set of materials shown in FIG. 4. FIG. 6A shows the normalized group index of refraction dispersion curve $\overline{n_g}(\lambda)$ calculated from the relationship $$\overline{n_g}(\lambda) = \frac{n_g(\lambda)}{n_g(\lambda_o)} \tag{4}$$

using 400 nm as the reference wavelength $\lambda_o$ for the same set of materials shown in FIG. 4 and FIG. 5. FIG. 6B shows an expanded view of the normalized group index of refraction dispersion curves for N-BK7 and soda lime glass over the range of 400 nm to 850 nm.

We can add a prospective material (e.g., a presently unknown material or a material that has a known identity but unknown properties to be characterized by the methods of the present disclosure, resulting in it becoming a known material) to the group index of refraction reference database of known materials by first calculating the group index of refraction as a function of wavelength from its known phase index of refraction data (see Polyanskiy) using Equation 3 and then extracting the calculated values of group index of refraction at the same set of k distinct center wavelengths of the tunable light source defined as $\lambda_j$ where j is an integer and j=1 to k inclusively with $\lambda_1$ being the shortest center wavelength of the tunable light source and $\lambda_k$ being the longest wavelength of the tunable light source that are used in all measurements.

The second method of getting data from different prospective materials into the group index of refraction database of known materials or the normalized group index of refraction database of known materials using a reference wavelength $\lambda_o$ uses a group index of refraction measurement cell attached to the measurement apparatus, an embodiment of which is shown in FIGS. 7A and 7B. The measurement cell is a special type of multilayer structure which consists of a top optical flat and a bottom optical flat separated by a spacer which contains a receiving surface located above the top optically flat surface of the bottom optical flat and below the bottom optically flat surface of the top flat for disposing a sample containing a layer of a prospective material to be added to the database of known materials.

The sample containing a layer of the prospective material to be added to the database of known materials can either be a single layer of the prospective material or a three layer laminate containing the prospective material to be added to the database sandwiched between a first known material and a second known material. The first and second known materials are required to be already in the database of known materials and they could be comprised of the same material. The three layer laminate is required to be used when a single layer sample of the prospective material cannot be measured, which is the case for many polymeric adhesive layers including polyvinyl butyral (PVB), thermoplastic polyurethane (TPU), and ethylene-vinyl acetate (EVA). The sample containing a layer of the prospective material to be added to the database of known materials is required to have top and bottom surfaces which are approximately parallel (within ±3°).

FIG. 7A shows an example group index of refraction measurement cell with a sample 82 containing a layer of a prospective material to be added to the database of known materials being disposed between a pair of optical flats, and FIG. 7B shows the group index of refraction cell without the sample 82 contained therein. The optical probe 56 shown in FIG. 7A and FIG. 7B is the same optical probe 56 that is attached to the sample arm optical fiber 54S of the dual interferometer embodiments shown in FIG. 1A and FIG. 1B. The optical probe 56 is mounted at a fixed distance above a measurement cell 80 which is used to determine group index of refraction dispersion curves and normalized group index of refraction dispersion curves of the layer of the prospective material to be added to the database of known materials. The optical probe used in FIG. 7A and FIG. 7B could also be the portable optical probe 57 shown in FIG. 1D and FIG. 1F. Two sets of measurements are required, a first set with the sample 82 containing a layer of a prospective material to be added to the database of known materials present in the measurement cell 80, and a second set of measurements without the sample 82 being present as described below.

The group index of refraction measurement cell 80 shown in FIG. 7A and FIG. 7B is comprised of a top optical flat 84 having a bottom optically flat surface $F_1$ and a bottom optical flat 86 having a top optically flat surface $F_2$ separated by a spacer 88 containing a cavity 78 between the bottom optically flat and the top optically flat surfaces $F_1$ and $F_2$. The spacer 88 causes the separation of surfaces $F_1$ and $F_2$ to be at a constant physical distance $d_o$, (also called the total gap) as shown in FIG. 7B. The spacer 88 also contains a receiving surface RS at a distance $d_2$ above the top optically flat surface $F_2$ of the bottom optical flat 86 for disposing the sample 82 containing a layer of a prospective material to be added to the database of known materials at a fixed position in cavity 78. The optically flat surfaces F1 and F2, the upper and lower surfaces of the spacer 88, and the receiving surface RS are constructed to be parallel to each other. The receiving surface RS divides the cavity into a larger diameter upper cavity between surfaces $F_1$ and RS and a smaller diameter lower cavity between surfaces RS and $F_2$.

Although the receiving surface RS is shown as a ledge for holding the sample 82 in place, other configurations for the receiving surface are possible. As an example, the receiving surface could be a clamp mounted externally to the measurement cell which holds the sample 82 near its perimeter and is adjusted to cause the bottom surface of the sample to be a fixed distance above the top surface F2 of the bottom optical flat 86. Typical dimensions for the diameters of the upper and lower parts of the cavity are 30-150 mm and 5-25 mm respectively.

The sample 82 containing a layer of a prospective material to be added to the database of known materials is required to be flat so that is has top and bottom surfaces which are nominally parallel to each other within a few degrees. The measurement cell 80 preferably includes a thermal control system (not shown) including a thermostat (not shown) to cause the measurement cell 80 to remain at a constant known temperature (±0.1° C.) throughout each set of measurements. Typical dimensions of the distance between surface $F_1$ and $F_2$ of cavity are 5-50 mm. The optical probe 56 is also normally aligned with respect to the optically flat surfaces of the measurement cell 80. The sample 82 containing a layer of a prospective material to be added to the database of known materials should have a physical thickness of at least 10 µm and can be as thick as 40 mm or more and is preferably in the range of 0.1 to 20 mm in physical thickness.

The following measurement procedure is used to add a new material to the group index of refraction dispersion curve and normalized group index of refraction dispersion reference database of known materials. A sample 82 containing the layer of the prospective material to be added to the database of known materials is first disposed into the measurement cell 80 at the receiving surface RS. The sample must be large enough so that it does not fall into the lower part of the cavity between the receiving surface RS and the top surface F2 of the bottom optical flat 86. The sample 82 shown in FIG. 7A is a single layer sample of the prospective material to be added to the database of known materials. During the first part of the measurement shown in FIG. 7A, the sample 82 containing the layer of the prospective material to be added to the database of known materials is mounted onto the receiving surface RS of the measurement cell 80 with the dual interferometer measuring at the same set of k distinct center wavelengths of the tunable light source $\lambda_j$, where j is an integer and j=1 to k inclusively with $\lambda_1$ being the shortest center wavelength of the tunable light source and $\lambda_k$ being the longest wavelength of the tunable light source as used when measuring unknown multilayer structures 28.

From the geometry in FIG. 7A, the optical interfaces that are observed in sequence during a low-coherence interferometer scan are the top surface of top optical flat 84, the bottom surface $F_1$ of the top optical flat 84, the top surface of the layer of prospective material 82 to be added to the database of known materials, the bottom surface of the layer of prospective material 82, the top surface $F_2$ of bottom optical flat 86 and the bottom surface of bottom optical flat 86. The physical distance between the bottom surface $F_1$ of the top optical flat 80 and the top surface of prospective material sample 82 is defined as $d_1$ (the top gap thickness); the physical distance between the top surface of the layer of prospective material 82 and the bottom surface of the layer of prospective material 82 is the thickness of the layer of prospective material 82, $t_m$; and the physical distance between the bottom surface of the layer of prospective material 82 and the top surface $F_2$ of bottom optical flat 86 is $d_2$ (the bottom gap thickness). The layer of prospective material 82 has a group index of refraction $n_{gm}(\lambda_j)$ at each measured wavelength of the low-coherence tunable source where j=1 to k and the air inside the cavity air has an index of refraction $n_a(\lambda_j)$. We define $T_1(\lambda_j)$ as the measured optical thickness of the top air gap, $T_2(\lambda_j)$ as the optical thickness of the layer of prospective material to be added to the database of known materials and $T_3(\lambda_j)$ as the measured optical thickness of the bottom air gap. For each measured wavelength $\lambda_j$, the measured optical thicknesses $T_1(\lambda_j)$, $T_2(\lambda_j)$ and $T_3(\lambda_j)$ are given by $$T_1(\lambda_j)=[n_a(\lambda_j)d_1], T_2(\lambda_j)=[n_{gm}(\lambda_j)t_m], T_3(\lambda_j)=[n_a(\lambda_j)d_2] \quad (5)$$

where $d_1$ and $d_2$ are the top and bottom physical air gap thicknesses, respectively and $n_a(\lambda_j)$ is the known group index of refraction of air at each of the measurement wavelengths. After these three parameters are measured as a function of wavelength, the sample is removed from the cell as shown in FIG. 7B and the optical distance $[n_a(\lambda)d_o]$ is measured as a function of wavelength $\lambda$. The cavity 78 gap physical distance $d_0$ (gap) is then calculated at all of the measured wavelengths $\lambda_j$ by the relationship $$d_o(\lambda_j) = \frac{[n_a(\lambda_j)d_o]}{n_a(\lambda_j)} \quad (6)$$

where $d_o(\lambda_j)$ is the measured value of physical distance $d_o$ using center wavelength $\lambda_j$. The mean value of $d_o(\lambda_j)$ is calculated and is set equal to $d_0$.

Figure 8:
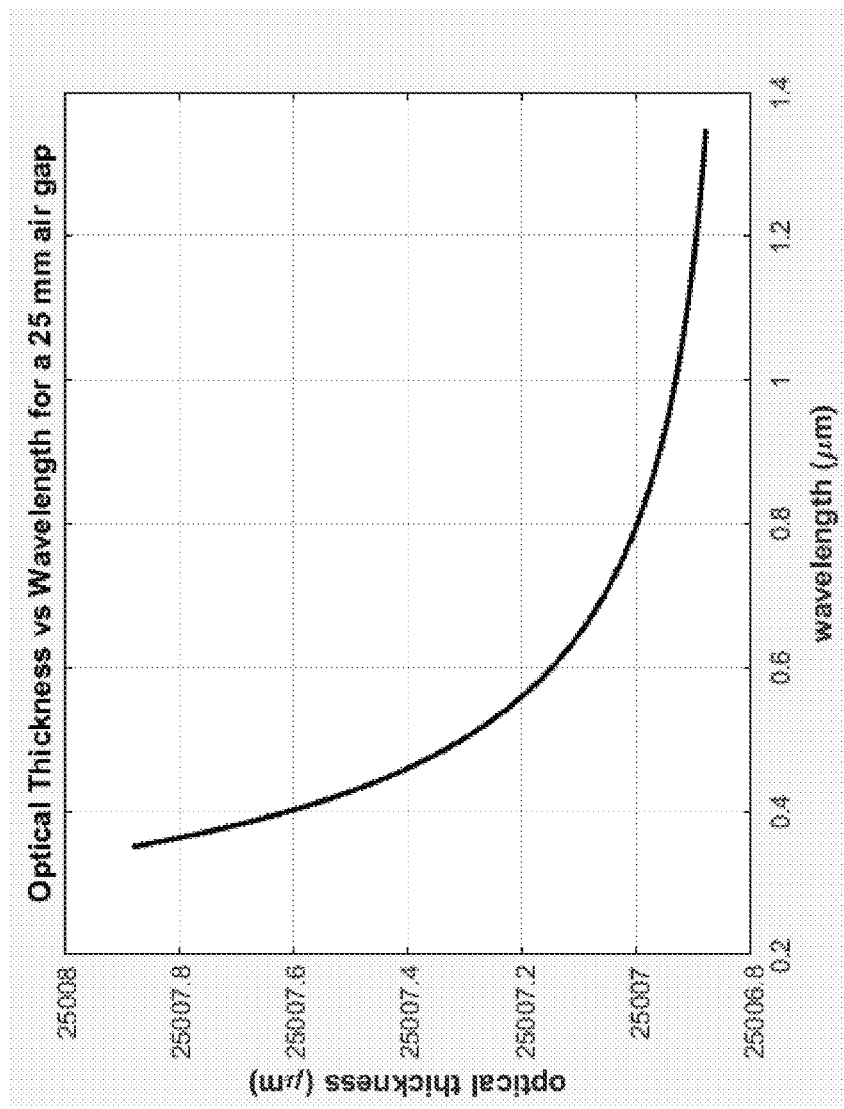
FIG. 8 shows a plot of the expected optical thickness of a 25 mm air gap as a function of wavelength.

Similarly the top and bottom air gap distances $d_1$ and $d_2$ shown in FIG. 7A can be found from the relationships $$d_1(\lambda_j) = \frac{[n_a(\lambda_j)d_1]}{n_a(\lambda_j)}; \text{ and } d_2(\lambda_j) = \frac{[n_a(\lambda_j)d_2]}{n_a(\lambda_j)} \quad (7)$$

where $d_1(\lambda_j)$ and $d_2(\lambda_j)$ are the measured values of physical distances $d_1$ and $d_2$ using center wavelength $\lambda_j$. The mean values of $d_1(\lambda_j)$ and $d_2(\lambda_j)$ are calculated and are set equal to $d_1$ and $d_2$ respectively. The phase and group index of refraction of air have been well characterized as a function of wavelength and temperature as described by Jack A. Stone and Jay H. Zimmerman, in the NIST, Engineering Metrology Toolbox, "Index of refraction of air" which can be found at http://emtoolbox.nist.gov/Wavelength/Documentation.asp. FIG. 8 shows a plot of the expected optical thickness for a 25 mm physical air gap distance $d_o$ as a function of wavelength at 20° C. The group index of refraction of air as a function of wavelength is included in the reference database of known materials.

Temperature control of the measurement cell 80 is important for accurate measurements. The group and phase index of refraction of most materials are slightly temperature dependent. The refractive index of air is 1.0002684 at 20° C. and 1.0002637 at 25° C., and the change with temperature is $-9.43\times10^{-7}/°$ C. at 20° C. and $-9.22\times10^{-7}/°$ C. at 25° C. For the 25 mm physical path length cuvette measured in air, a 1° C. temperature change will result in a 23.6 nm error in the calculation of the physical path length $d_o$ of the cavity 78 in the measurement cell 80 when measured at 20° C., and a 23.1 nm error when measured at 25° C. Most other optical materials including glasses and plastics have larger changes in refractive index with temperature than air. As examples the change in refractive index with temperature near room temperature for acrylic materials is approximately $-8.5\times10^{-5}/°$ C. and for N-BK7 glass refraction, the value is $1.6\times10^{-5}/°$ C.

From the measured parameters $d_o$, $d_1$ and $d_2$, we can then calculate the physical thickness $t_m$ of the layer of prospective material 82 to be added to the database of known materials from the relationship $$t_m = d_o - d_1 - d_2 \quad (8)$$

The physical distances $d_o$, $d_1$ and $d_2$ are independent of wavelength, and the statistical variation in the measured values as a function of wavelength is an indication of the instrument's measurement repeatability. The physical thickness $t_m$ of the prospective material 82 is also independent of wavelength. Once the physical thickness $t_m$ of the layer of prospective material 82 is known, we can then calculate the group index of refraction at each of the measured wavelengths $\lambda_j$ of the prospective material sample 82 as a function of wavelength from the relationship $$n_{gm}(\lambda_j) = \frac{[n_{gm}(\lambda_j)t_m]}{t_m}. \quad (9)$$

Once we know the group index of refraction of the layer of the prospective material 82 to be added to the database of known materials as a function of wavelength, we can then add its group index of refraction dispersion curve to the known material database. The normalized group index of refraction dispersion curve is then also calculated using the standard reference wavelength $\lambda_o$. The measured group index of refraction as a function of wavelength for the newly measured and known material is first added to the reference material database of known material group index of refraction dispersion curves. The normalized group index of refraction dispersion curve for this newly known material is now calculated by dividing the group index of refraction dispersion curve by the reference wavelength $\lambda_o$ as described above using Equation 4.

Figure 7C:
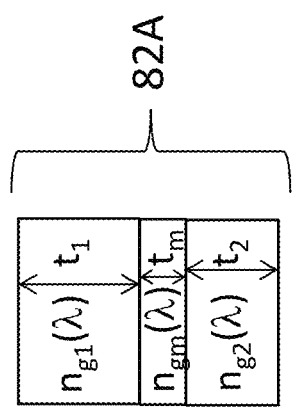
FIG. 7C shows a three layer sample which contains a material to be added to the reference database of known materials sandwiched between a first known material and a second known material.

With some materials such as adhesive layers, it is not possible to produce a single layer of the material that can be measured in an index of refraction cell. In these cases the layer of prospective material to be added to the group index of refraction database of known materials can be disposed between a layer of a first known material and a layer of a second known material as shown in FIG. 7C. FIG. 7C shows the three layer structure as having a first layer of known material having group index of refraction $n_{gi}(\lambda)$ and thickness $t_1$, with a middle layer of the prospective material to be added to the reference database having group index of refraction $n_{gm}(\lambda)$ and thickness $t_m$, and a second layer of known materials having group index of refraction $n_{g2}(\lambda)$ and thickness $t_2$. When the three layer laminate containing the layer of the prospective material to be added to the database of known materials shown in FIG. 7C is disposed in the measurement cell, the optical thicknesses of the first layer of known material $[n_{g1}(\lambda)t_1]$ and second layer of known material $[n_{g2}(\lambda)t_2]$ are measured at each of the k distinct center wavelengths using the interferometer apparatus, in addition to the optical thickness of the layer of the prospective material to be added to the database of known materials $[n_{gm}(\lambda)t_m]$ and the top and bottom air gap optical thicknesses $[n_a(\lambda)d_1]$ and $[n_a(\lambda)d_2]$.

The thicknesses of the top and bottom air gaps $d_1$ and $d_2$ are determined by dividing the top and bottom air gap optical thicknesses measured at each of the k distinct center wavelengths by the group index of refraction of air at each of the k respective wavelengths using Equation 7 and calculating the mean values of the top and bottom air gap. The thicknesses of the first known material $t_1$ and the second known material $t_2$ are determined by dividing the measured optical thicknesses at each of the k distinct center wavelengths of the first and second known materials by their respective known group indexes of refraction at each of the k respective wavelengths and calculating the mean values of the thickness of the first known material and the second known material. The known group indexes of refraction are found in the group index of refraction database of known materials.

As described above with reference to Equation 6, the thickness of the total airgap is determined by dividing the total air gap optical thicknesses measured at each of the k distinct center wavelengths by the group index of refraction of air at each of the k respective wavelengths and calculating the mean value of the thickness of the total air gap without the three layer sample being disposed in the measurement cell. The thickness $t_m$ of the layer of the prospective material to be added to the database of known materials is then determined by subtracting the sum of the top air gap thickness $d_1$, the first known material thickness $t_1$, the second known material thickness $t_2$ and the bottom air gap thicknesses $d_2$ from the total air gap thickness $d_o$, by the relationship $$t_m = d_o - d_1 - d_2 - t_1 - t_2. \tag{10}$$

The group index of refraction dispersion curve of the prospective material to be added to the database of known materials is then calculated by dividing the optical thickness of the prospective material to be added to the group index of refraction database of known materials measured at each of the k distinct center wavelengths by the thickness of the layer of the prospective material to be added to the database of known materials. The group index of refraction data for the newly characterized known material measured using the index of refraction measurement cell is then added to the database of known material group index of refraction dispersion curves, and its Sellmeier equation is calculated based on the measured center wavelength group index of refraction data and is also added to the database.

The reference database of known materials also includes the derived group index of refraction Sellmeier equation for each of the known and measured prospective materials, which is given by the relationship $$n_g^2(\lambda) - 1 = \sum_i^m \frac{B_i \lambda^2}{\lambda^2 - C_i} \tag{11}$$

where i and m are integers and i varies from 1 to m and $B_i$ and $C_i$ are constants. For most optical glasses, three sets of coefficients are used (m=3) and for many plastics only one set of coefficients is needed (m=1). The group index of refraction of prospective material samples 82 measured as a function of wavelength are converted to the Sellmeier form of Equation 10 by calculating the best fit coefficients $B_i$ and $C_i$ to the measured data.

The measurement cell 80 shown in FIG. 7 can also be used to measure the total physical thickness of a multilayer structure 28. The optical thickness of the total gap in the cell $d_o$ is first measured without the multilayer structure being present. Then the multilayer structure is placed in the measurement cell in the same location of the prospective material sample 82 and the optical thicknesses of the top air gap $d_1$ and the bottom air gap $d_2$ are measured as before and applying Equation 8 to get the total physical thickness. The total physical thickness measurement can become important to distinguish between two materials which have very close normalized group index of refraction profiles since they will generally have different group index of refraction values. Comparing the total physical thickness of the multilayer structure measured in the measurement cell with that obtained by identifying the best fit materials for each layer of the multilayer structure from their calculated normalized group index of refraction dispersion curves to a reference database of known materials group index of refraction dispersion curves can also be used as a confirmation for the materials identification.

The measurement cell for measuring the total physical thickness of the multilayer structure 28 or a sample containing the layer of a prospective material to be added to the database of known materials group index of refraction dispersion curves (both referred to as a test object) can also have a different structure to that shown in FIG. 7A and FIG. 7B. When the test object is installed in a suitable measurement cell, the measurement cell must have a top optically flat surface located above the top surface of the test object to form an upper airgap and a bottom optically flat surface located below the bottom surface of the test object to form a lower airgap. The requirements are that the two optically flat surfaces are parallel to each other and remain a fixed distance apart. The multilayer structure 28 is mounted between the top and bottom optically flat surfaces so that its outer surfaces at the location of measurement are nearly parallel to the top and bottom optically flat surfaces of the measurement cell. During measurements using the interferometer apparatus, the optical thickness of the upper airgap and the lower air gap are also measured along with the optical thickness of each of the observed layers in the test object as a function of wavelength of the low-coherence tunable light source. The receiving surface RS may be defined as any structure that causes the sample 82 or 82A to remain at a fixed distance above the top surface F2 of the bottom optical flat 86 when disposed between the pair of optical flats.

For an m layer sample the maximum number of observed optical interfaces will be m+1. Thus, the number of layers in the multilayer structure is equal to 1 less than the maximum number of optical interfaces measured in the sample as a function of incident wavelength $\lambda_j$ of the filtered low-coherence light source 13. When measuring a multilayer optical structure having m layers there are usually m+1 optical interfaces observed in an interferometer distance scan. In some cases all of the optical interfaces in the multilayer structure may not be observed at all of the measured wavelengths $\lambda_j$. This occurs when the group index of refraction is the same or nearly the same for two adjacent layers in the multilayer structure 28.

Figure 9:
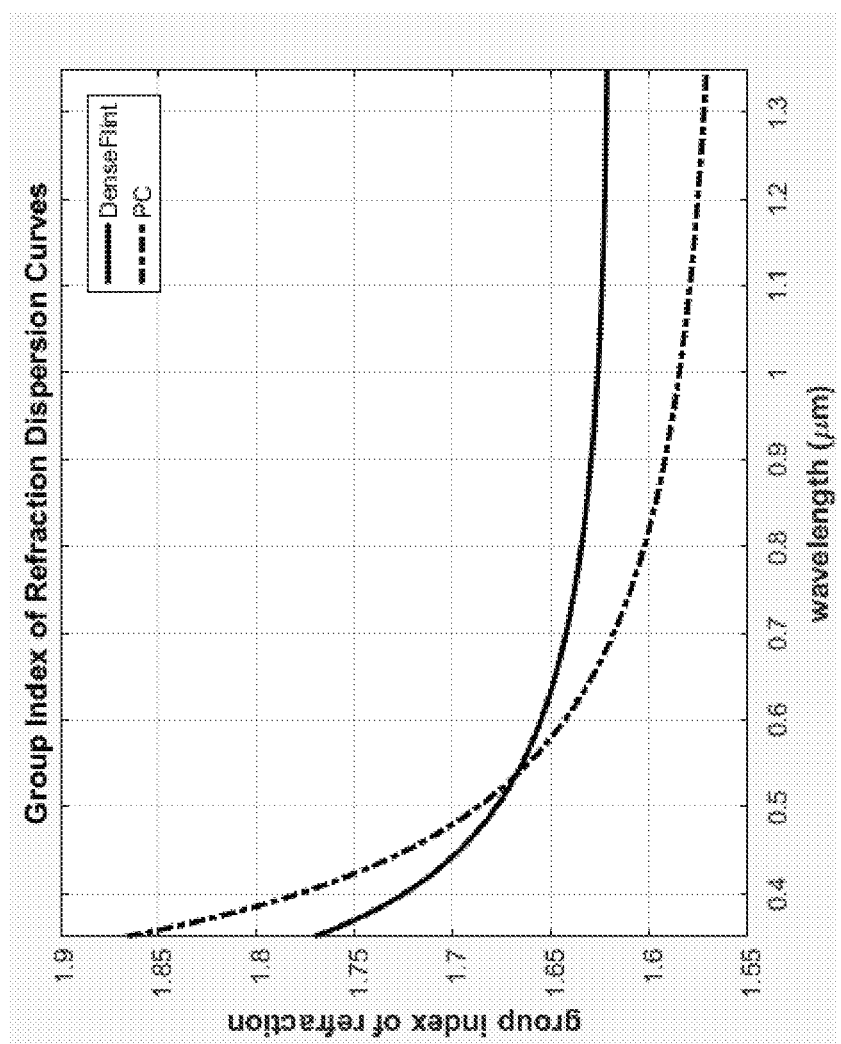
FIG. 9 shows group index of refraction dispersion curves for two materials that intersect at 536.5 nm.

FIG. 9 shows an example of two group index of refraction dispersion curves for dense flint glass and for polycarbonate plastic in which the dispersion curves cross at a wavelength of 536.5 nm where both materials have a group index of refraction of 1.6682. For the dual low-coherence interferometer apparatus 100, 100A, 100B, 100C, 100D, 100E, and 100F shown in FIG. 1, FIG. 1A, FIG. 1B, FIG. 1C, FIG. 1D, FIG. 1E, and FIG. 1F respectively, the individual optical interfaces for each layer will not be observable when the group index of refraction of two adjacent layers differ by less than about 0.001. For the example shown in FIG. 9, the instrument will not see the optical interface when for center wavelengths between 532.5-539.5 nm when dense flint glass is adjacent to polycarbonate plastic. When the ith and ith+1 layers of an m layer multilayer structure have the same group index of refraction to within 0.001 at a wavelength $\lambda_c$, no discernable optical interface will occur between the layers $i^{th}$ and the i+1 $^{th}$ layers and the measured optical thickness of these layers will be $[n_{gi}(\lambda_c)t_i+n_{gi}(\lambda_c)t_{i+1}]$ and only m−1 layers will be observed in the measured interferogram similar to that shown in FIG. 3. The wavelength regions where less than the usual number of measured layers occur can be readily found in the analysis since there will be less than m+1 optical interfaces in the measured interferograms in these relatively narrow regions of the optical spectrum. It is also relatively easy to tell which optical interface is missing in the data by looking at its relative location in the interferogram scan. The optical thickness data for the two layers containing the missing optical interface can then be omitted from the normalized group index of refraction calculations described in Equation 1.

In order to determine how many layers are in the multilayer structure, we first determine the maximum number of optical interfaces observed in the interferometer scans as a function of center wavelength $\lambda_j$ of the filtered low-coherence light source 13 as the center wavelength is varied from $\lambda_1$ to $\lambda_k$. Most of the scans at different center wavelengths will have the same number of optical interfaces observed in the multilayer structure which is equal to the maximum number of optical interfaces and equal to m+1 where m is the number of layers in the multilayer structure 28 being tested. In some multilayer structures one to a few wavelength regions will have fewer peaks. When this occurs, 1-3 adjacent center wavelengths could be missing an optical interface at regions when the group index of refraction of the adjacent layers cross each other as shown in the example of FIG. 9. The air-top layer interface and the bottom layer-air interface will always be observed since the index of refraction of all solid materials is always greater than one.

Figure 10:
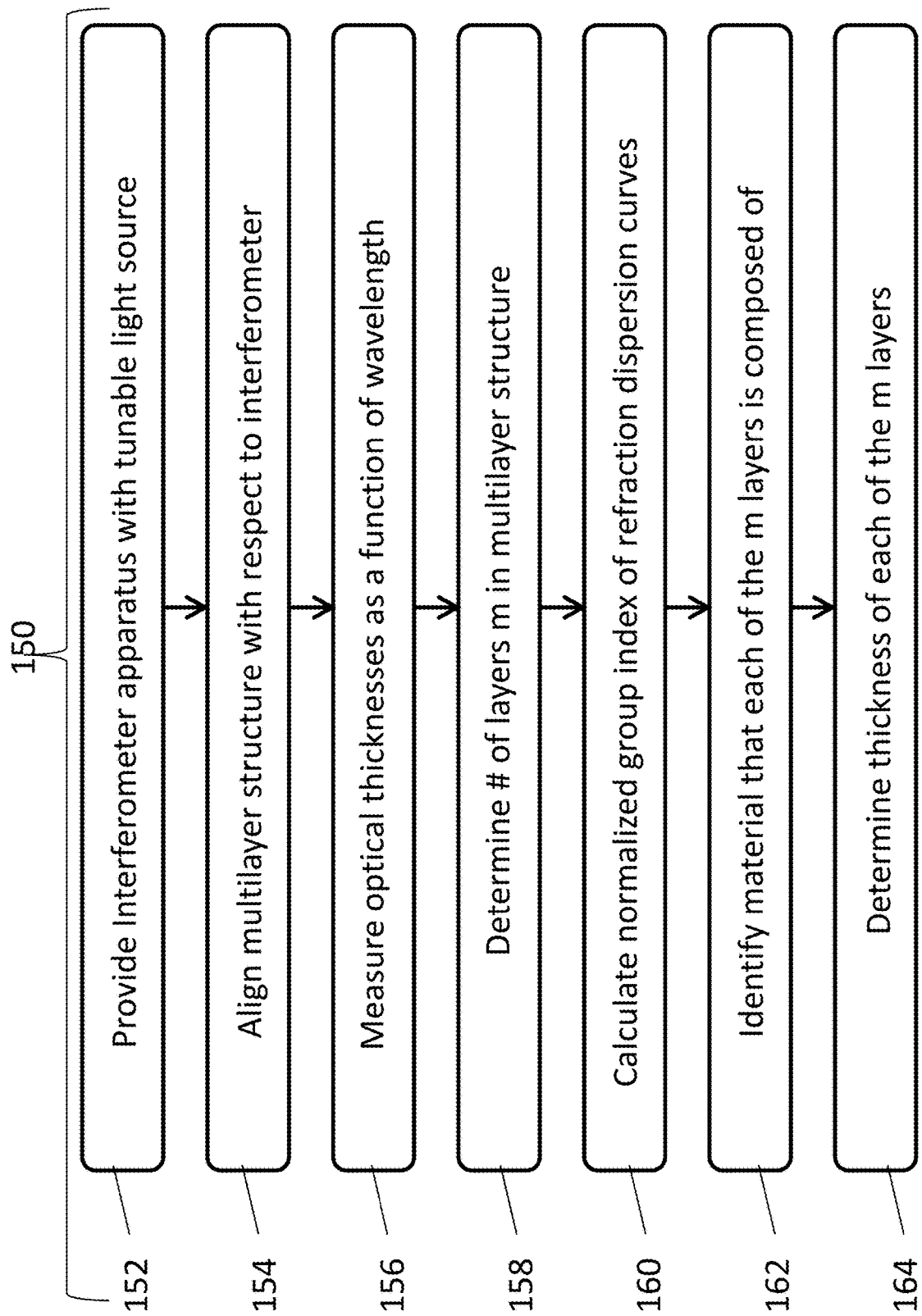
FIG. 10 shows a flow chart detailing the steps of a method used to identify the material composition of each layer in a multilayer structure and to determine each layer's physical thickness.

FIG. 10 is a flow chart 150 showing the steps performed in carrying out a method of identifying the material composition of each layer in a multilayer structure and to determine each layers physical thickness. The first Step 152 is to provide an interferometer apparatus with a tunable low-coherence light source. Suitable interferometer apparatuses 100, 100A, 100B, 100C, 100D, 100E, and 100F have been described with reference to the descriptions of FIG. 1, FIG. 1A, FIG. 1B, FIG. 1C, FIG. 1D, FIG. 1E, and FIG. 1F respectively. Step 152 is followed by Step 154 in which the portion of the multilayer structure to be tested is aligned with respect to the interferometer apparatus. In some cases the multilayer structure will be set up in the measurement region of the instrument such as that shown in FIG. 1. In many cases the multilayer structure could be something mounted in its location of use such as a window in a vehicle, aircraft or a building and a portable interferometer apparatus having a portable optical probe is used, which will automatically align with the multilayer structure in situ. After the multilayer structure is mounted and aligned, Step 154 is followed by Step 156 in which the interferometer apparatus is used to measure the optical thickness of each of the observed layers in the multilayer structure as a function of center wavelength of the low-coherence tunable light source. A standard set of k center wavelengths $\lambda_j$ is selected where j=1 to k with $\lambda_1$ being the shortest wavelength, $\lambda_k$ being the longest wavelength and each successive $\lambda_j$ is longer than $\lambda_{j-1}$. The locations of the peaks in interferometer scans obtained at each of the k distinct center wavelengths are determined and the scan distances between each successive optical interface define the optical thicknesses being measured. The total number of layers measured at each measurement wavelength $\lambda_j$ is noted in this Step.

Step 156 is followed by Step 158 in which the number of layers m in the multilayer structure is determined. The number of layers m in the multilayer structure is set equal to the maximum number of layers observed in Step 156. Typically the number of observed layers m will be the same and equal to the maximum number of observed layers for all or almost all of the measured wavelengths $\lambda_j$ of the tunable low-coherence light source. Adjacent layers will not be observed at small wavelength ranges where their group index of refraction dispersion curves cross each other as discussed above during the discussion of FIG. 9.

It is relatively easy to determine which layers are missing from the peak location data as a function of the k distinct center wavelengths and the optical thickness data. When there is a single missed optical interface, the observed optical thickness will be the sum of two adjacent layers optical thickness. The optical thickness data measured with low-coherence light source center wavelengths containing missed optical interfaces are eliminated from the measured optical thickness data before proceeding to the next step 158.

Step 158 is followed by Step 160 in which the normalized group index of refraction dispersion curves are calculated for each of the m layers in the multilayer structure by selecting one center wavelength of the tunable light source as a reference wavelength and calculating the ratio of the measured optical thickness at each measurement wavelength to that measured at the selected reference wavelength for each of the m layers in the multilayer structure. Step 160 is followed by step 162 in which the material that each layer in the m layer multilayer structure is comprised of is identified by comparing its calculated normalized group index of refraction dispersion curve to a reference database of known materials group index of refraction dispersion curves and finding the best fit material for each of the m layers in the multilayer structure. Step 162 is followed by Step 164 in which the physical thickness of each of the m layers of the multilayer structure is determined by dividing the measured optical thickness at each measured center wavelength of the tunable light source by the group index of refraction of the identified material at the respective measured center wavelength and calculating its average value for each of the m layers in the multilayer structure.

Figure 11:
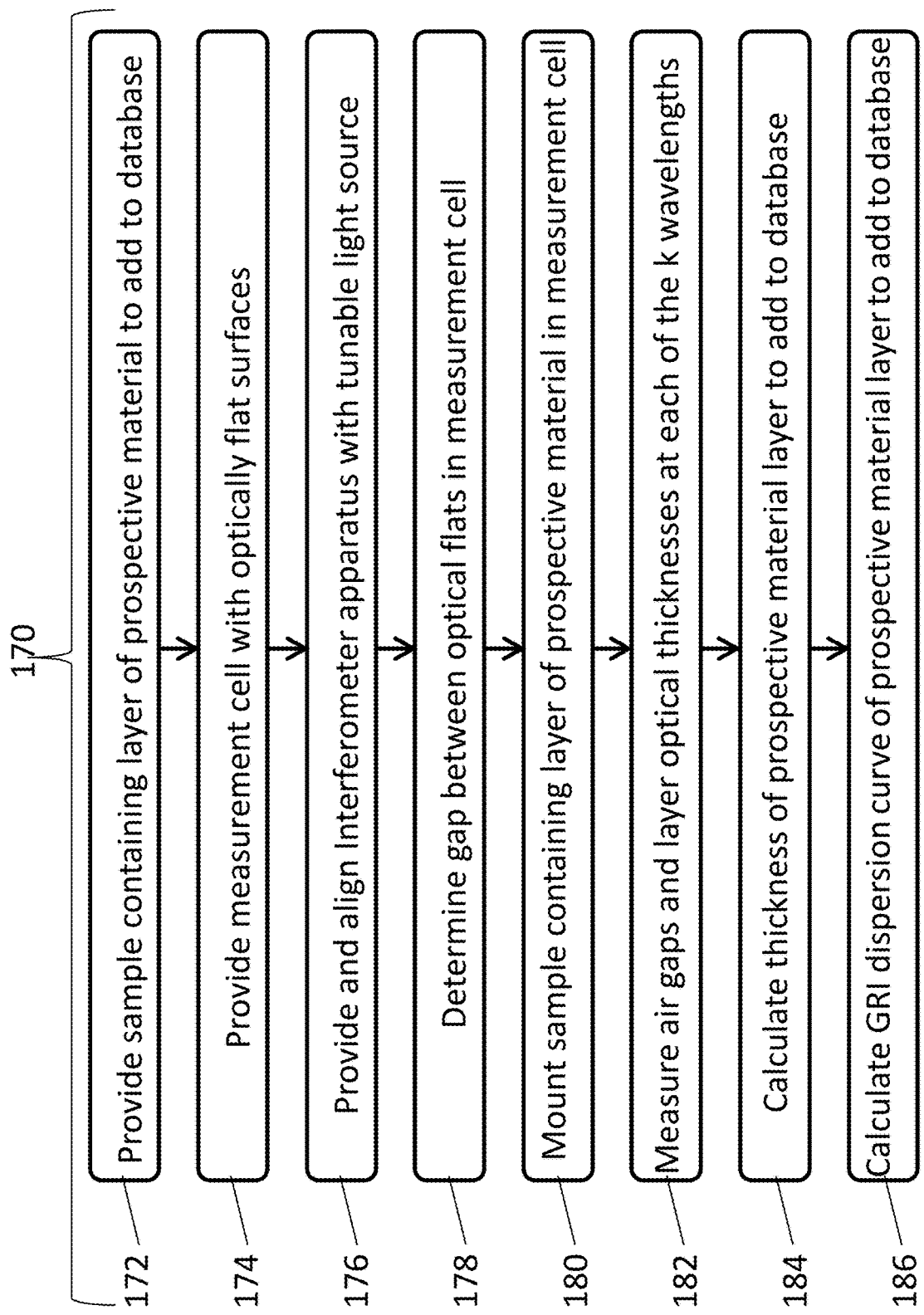
FIG. 11 shows a flow chart detailing the steps of a method to determine the group index of refraction dispersion curve for a known material.

FIG. 11 is a flow chart 170 showing the steps of a method to determine the group index of refraction dispersion curve for a prospective material, which is to be added to the group index of refraction database of known materials. The first Step 172 is to provide a flat sample containing a layer of the prospective material to be added to the group index of refraction database of known materials. The sample containing a layer of the prospective material to be added to the group index of refraction database of known materials can either be a flat single layer sample of the prospective material or a three layer laminate with the prospective material to be added to the group index of refraction database sandwiched between a first known material in the database and a second known material in the database.

Step 172 is followed by Step 174 in which a measurement cell with optically flat surfaces is provided. The measurement cell will be comprised of a top flat having a bottom optically flat surface and a bottom optical flat having a top optically flat surface which are separated by a total gap larger than the physical thickness of the flat single layer sample, and the bottom and top optically flat surfaces are parallel to each other. Step 174 is followed by Step 176 in which an interferometer apparatus having a low-coherence tunable light source and an optical probe is provided and normally aligned to the optically flat surfaces of the measurement cell provided in Step 174.

Step 176 is followed by Step 178 in which the gap between the bottom optically flat surface of the top flat and the top optically flat surface of the bottom flat of the measurement cell is determined. This measurement is performed by measuring the optical distance of the gap as a function of wavelength of the low-coherence tunable light source and dividing by the group index of refraction of air at each of the respective wavelengths and calculating the average value of the gap measured as a function of wavelength of the tunable light source. All Steps with measurements that are measured as a function of wavelength of the tunable light source are measured at the same set of k distinct center wavelengths of the tunable light source defined as $\lambda_j$ where j is an integer and j=1 to k inclusively with $\lambda_1$ being the shortest center wavelength of the tunable light source and $\lambda_k$ being the longest wavelength of the tunable light source. Each successive wavelength measured is at a longer wavelength than the previous one so that $\lambda_1 < \lambda_2 < \lambda_3 \ldots < \lambda_{k-1} < \lambda_k$.

Step 178 is followed by Step 180 in which the sample containing the layer of the prospective material to be added to the group index of refraction database of known materials is mounted in the measurement cell in the gap between the bottom optically flat surface of the top flat and the top optically flat surface of the bottom flat. The sample containing the layer of the prospective material is mounted so that it is parallel to the optically flat surfaces of the measurement cell. Step 180 is followed by Step 182 in which the interferometer apparatus is used to determine the top gap between the bottom optically flat surface of the top flat and the top surface of the sample containing the layer of prospective material to be added to the database, the optical thickness of each of the layers of the sample containing the layer of prospective material to be added to the database and the bottom gap between the bottom surface of the sample containing the layer of prospective material to be added to the database and the top optically flat surface of the bottom flat as a function of wavelength of the low-coherence tunable light source. The top gap and the bottom gap are determined by measuring the optical distance of the top and bottom gaps as a function of wavelength of the low-coherence tunable light source and dividing the top and bottom gap optical distances by the group index of refraction of air at each of the respective measured wavelengths and calculating the average values of the top and bottom gaps.

Step 182 is followed by Step 184 in which the thickness of the layer of prospective material to be added to the database is determined. When the sample containing the layer of prospective material is a single layer sample its thickness is determined by subtracting the sum of the top gap $d_1$ and the bottom gap $d_2$ from the total gap $d_o$ of the measurement cell. When the sample containing the layer of prospective material is a three layer laminate with the prospective material to be added to the group index of refraction database sandwiched between a first known material in the database and a second known material in the database, the thicknesses of the first known material and the second known materials are first determined. This is performed by dividing the measured optical thicknesses at each of the k distinct center wavelengths of the first and second known materials by their respective known group indexes of refraction at each of the k respective wavelengths and calculating the mean values of the thicknesses $t_1$ and $t_2$ of the first known material and the second known material, respectively.

The thickness of the layer of the prospective material to be added to the database is then determined by subtracting the sum of the top gap $d_1$, the first known material thickness $t_1$, the second known material thickness $t_2$ and the bottom gap $d_2$ from the total gap $d_o$ of the measurement cell. Step 184 is followed by Step 186 in which the group index of refraction dispersion curve for the layer of prospective material is determined. This is done by dividing the optical thickness of the prospective material layer measured as a function of wavelength of the low-coherence tunable light source by the calculated physical thickness of the prospective material layer. At this point, the characterization of the prospective material is complete, thereby establishing it as another known material. The group index of refraction GRI dispersion curve data measured as a function of wavelength for the newly established known material can then added to the database of known materials. The measured data as a function of wavelength for the new known material can also be put in the form of a Sellmeier equation by calculating the best fit Sellmeier coefficients $B_i$ and $C_i$ to the measured data.

Figure 12:
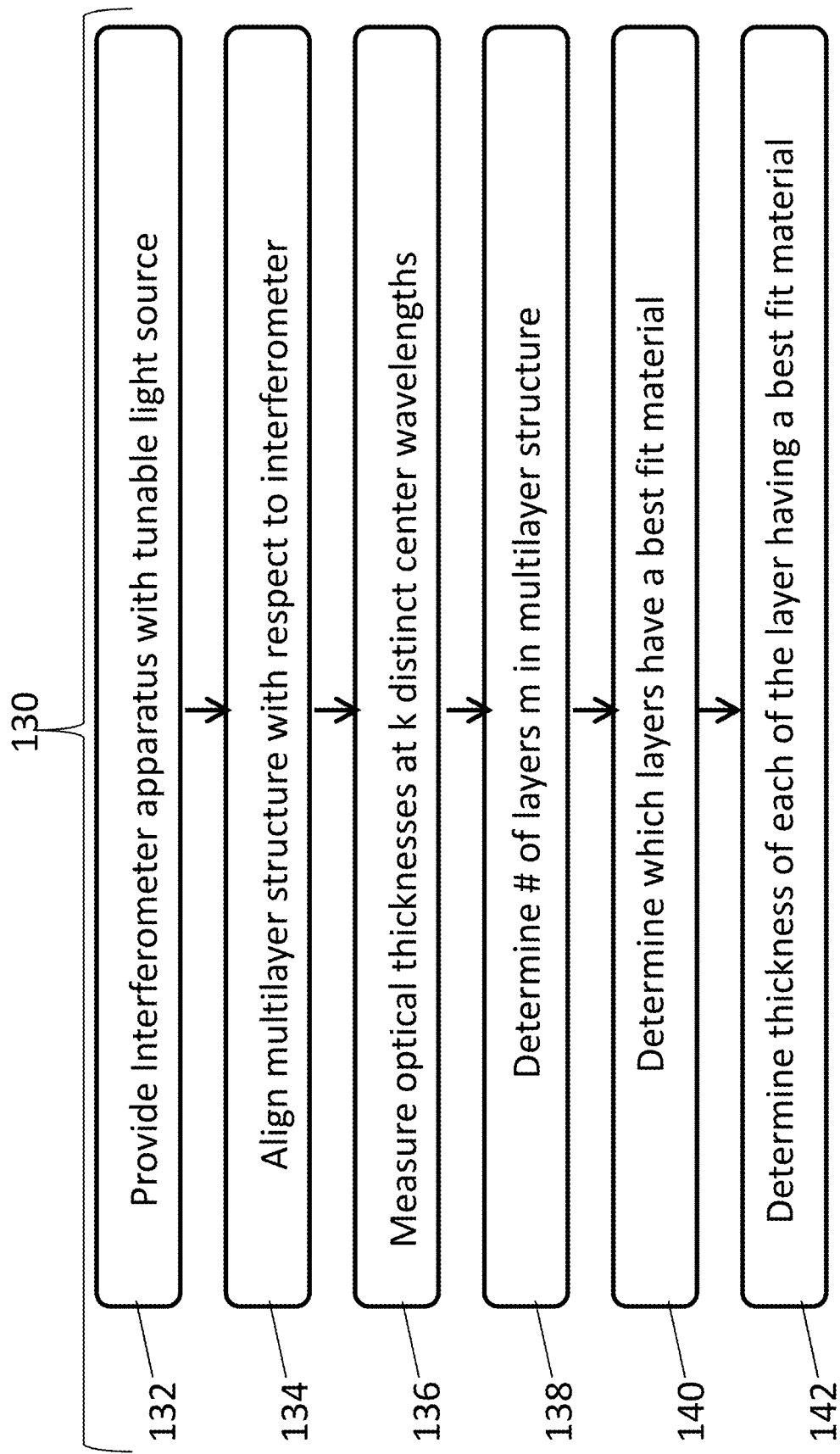
FIG. 12 shows a flow chart detailing the steps of a second method to identify the composition of each layer in a multilayer structure and to determine each layer's physical thickness.

FIG. 12 shows a flow chart 130 showing the steps performed in carrying out of an alternate method of characterizing each layer in a multilayer structure comprising m layers where m is an integer greater than 2. The characterization includes determine the number of layers m in the multilayer structure and identifying the material composition of the layers in the structure. This method uses the group index of refraction database of materials without calculating the normalized group which was described with reference to FIG. 10. The first Step 132 is to provide an interferometer apparatus with a tunable low-coherence light source which can be tuned to at least a set of k distinct center wavelengths where k is an integer greater than 2. Any of the suitable interferometer apparatus described in Step 152 of FIG. 10 can be utilized in Step 132.

Step 132 is followed by Step 134 in which the multilayer structure is aligned with respect to the measurement region of the interferometer apparatus. Use of the portable optical probe 57 shown in FIG. 1D and FIG. 1F, which automatically aligns itself to the front surface of the multilayer structure when placed in contact with the surface, is the preferred method of ensuring alignment. Step 134 is followed by Step 136 in which the interferometer apparatus is used to measure the optical thickness of each of the observed layers in the multilayer structure with the low-coherence tunable light source being tuned to each of the set of k distinct center wavelengths. During step 136, the low-coherence tunable light source is tuned to each of the set of k distinct center wavelengths. At each measurement wavelength, the variable optical path delay element 90 of the interferometer apparatus is repetitively scanned to determine the locations of the observed optical interfaces in the multilayer structure being tested. The distances between the observed locations of adjacent optical interfaces are calculated for each scan, and data for corresponding layers are averaged. TABLE 2 shows the measured average optical thickness for an example three layer structure. The set of k distinct center wavelengths used to measure the example three layer structure is shown in column 1 of TABLE 2. Columns 2-4 of TABLE 2 show the average layer thickness in micrometers (μm) for each of the observed layers in the example three layer structure measured as a function of wavelength.

TABLE 2

Measured optical thickness of each layer in a multilayer structure at a set of k distinct center wavelengths in nanometers (nm).

| nm | Layer 1 | Layer 2 | Layer 3 |
|---|---|---|---|
| 450 | 14556.559 | 2313.334 | 16928.428 |
| 500 | 14439.139 | 2295.726 | 16819.394 |
| 520 | 14395.134 | 2287.972 | 16779.671 |
| 550 | 14345.488 | 2279.946 | 16733.898 |
| 568 | 14324.352 | 2275.993 | 16713.207 |
| 600 | 14286.820 | 2270.064 | 16676.923 |
| 650 | 14235.187 | 2261.316 | 16628.431 |
| 700 | 14198.418 | 2254.911 | 16593.237 |
| 750 | 14166.297 | 2250.388 | 16567.469 |

Step 136 is followed by Step 138 in which the number of layers m in the multilayer structure is determined. The number of layers m in the multilayer structure is set equal to the maximum number of layers observed in Step 136. For the example shown in TABLE 2, the maximum number of observed layers is three. Step 138 is followed by step 140 in which the measured optical thickness of each of the m layers is compared with the reference database of known material group index of refraction dispersion curves to determine if there is a best fit material for each of the m layers.

TABLE 3 shows group index of refraction data for six materials in the reference database of known material group index of refraction dispersion curves measured at the same set of k distinct center wavelengths, as were used to measure the example three layer structure. In general, the reference database of known material group index of refraction dispersion curves will include many more materials, but we show only these six materials to illustrate the procedure. Column 1 of TABLE 3 shows the same measurement wavelengths (λ) corresponding to those in Column 1 of TABLE 2. Columns 2-7 of TABLE 3 show the group indices of refraction for Starphire® (a low iron soda lime glass manufactured and sold by PPG Industries, Inc. of Pittsburgh Pa.), polycarbonate (PC), Borofloat® 33 glass (a borosilicate glass manufactured and sold by SCHOTT North America, Inc. of Louisville Ky.), Plexiglas® (a polymethyl methacrylate polymer manufactured and sold by Evonik Röhm GmbH of Darmstadt, Germany), thermoplastic polyurethane (TPU), and polyvinyl butyral (PVB), respectively, measured at the same set of nine wavelengths A in nanometers (nm) shown in Column 1 which were used to measure the example three layer multilayer structure (TABLE 2).

TABLE 3

Reference Database of Known Materials Group index of refraction example

| λ (nm) | Starphire ® | PC | Borofloat ®33 | Plexiglas ® | TPU | PVB |
|---|---|---|---|---|---|---|
| 450 | 1.576317 | 1.711855 | 1.515214 | 1.545711 | 1.554085 | 1.540102 |
| 500 | 1.563301 | 1.676538 | 1.505010 | 1.532056 | 1.540571 | 1.528118 |
| 520 | 1.558843 | 1.664046 | 1.501810 | 1.527613 | 1.534187 | 1.523057 |
| 550 | 1.553571 | 1.649943 | 1.497665 | 1.522171 | 1.527450 | 1.517760 |
| 568 | 1.551225 | 1.643901 | 1.495855 | 1.519691 | 1.525889 | 1.515164 |
| 600 | 1.547017 | 1.633606 | 1.492583 | 1.515411 | 1.521523 | 1.511143 |
| 650 | 1.541637 | 1.620040 | 1.488482 | 1.509814 | 1.514354 | 1.505197 |
| 700 | 1.537446 | 1.610018 | 1.485313 | 1.505450 | 1.509939 | 1.501099 |
| 750 | 1.534125 | 1.601808 | 1.482818 | 1.501956 | 1.506624 | 1.498063 |

In Step 140, the layers which have a known best fit material are determined. During Step 140, the optical thickness measured with the low-coherence tunable light source tuned to each of the k distinct center wavelengths, for each of the m layers, is compared to a reference database of known material group index of refraction dispersion curves measured at the same set of k distinct center wavelengths, in order to determine which layers have a best fit material in the reference database of known materials The comparison includes applying a best fit material identification algorithm to the measured optical thickness data, which utilizes the known material group index of refraction reference database to determine the best fit material, if it exists, for each of the m layers in the multilayer structure. Each of the layers of the multilayer structure having best fit materials can be identified as being composed of the best fit material for that layer. Step 140 is followed by step 142 in which the thickness of each of the identified layers is determined.

Figure 12A:
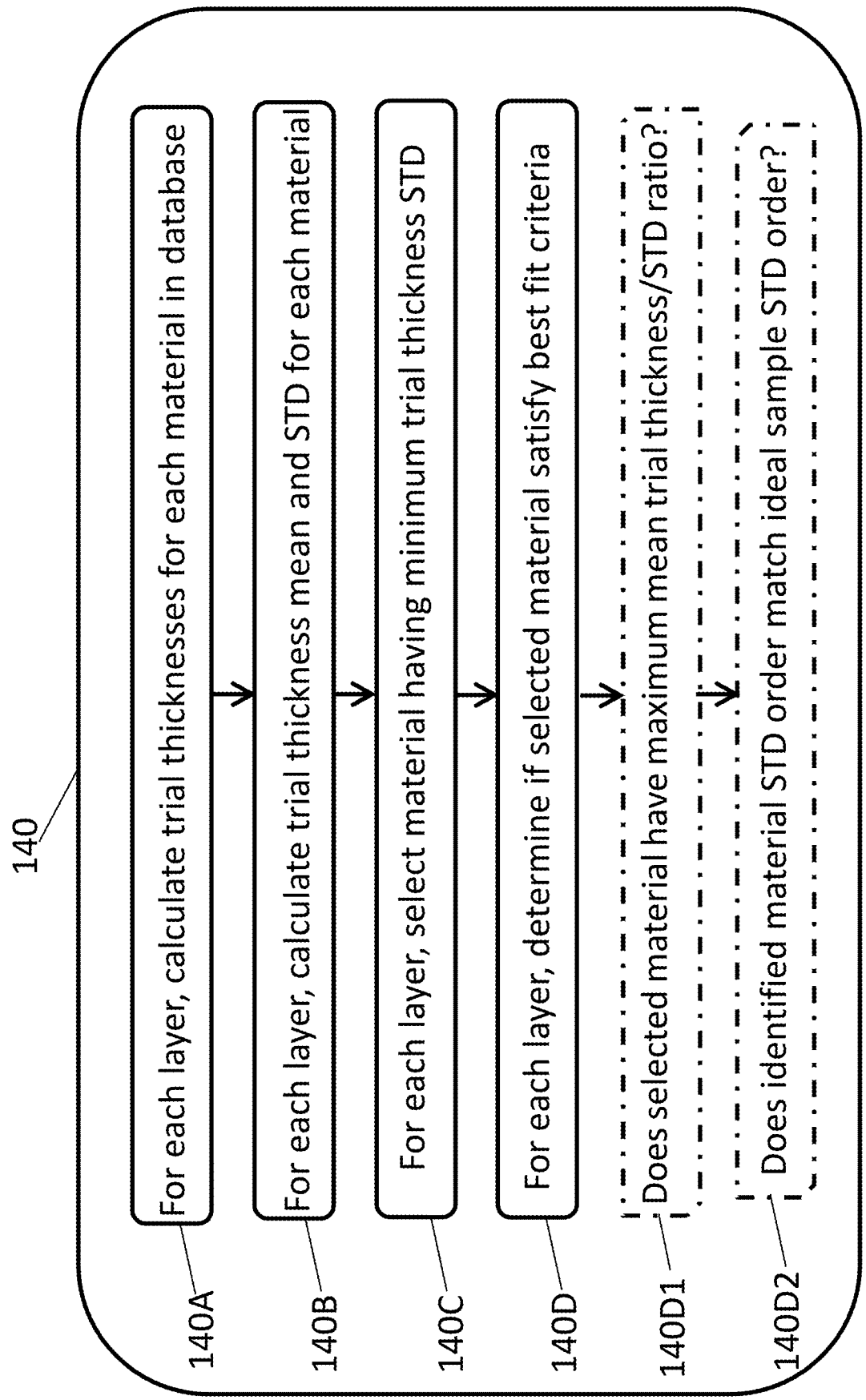
FIG. 12A shows a flowchart containing further details of Step 140 of FIG. 12.

Further details of Step 140 are shown in FIG. 12A utilizing a preferred material identification algorithm. All of the Substeps 140A-140D shown in FIG. 12A are applied to each of the m layers in the multilayer structure individually. In Substep 140A a set of k trial thickness values is calculated for each material in the reference database of known materials group index of refraction utilizing the optical thickness data measured at each of the k distinct center wavelengths for each of the m layers in the multilayer structure. The sets of k trial thickness values for each of the m layers in the multilayer structure are calculated by dividing the measured optical thickness of the layer in the multilayer structure measured at each of the k distinct center wavelengths by the known group index of refraction at each of the k corresponding wavelengths for each known material in the reference database. At the completion of Substep 140A, there will be a set of k trial thickness values for each known material in the group index of refraction database of known materials for each of the m layers in the multilayer structure. Substep 140A is followed by Substep 140B in which the mean and standard deviation (STD) of each of the sets of k trial thickness values are calculated for each of the known materials in the reference database. Substep 140B is followed by Substep 140C in which the material composition having the minimum standard deviation in its trial thickness is identified and selected. Substep 140C is followed by Substep 140D in which a set of criteria are used to determine if the material having the minimum trial thickness standard deviation can be considered to be the best fit material. If the criteria are met, the material having the minimum trial thickness standard deviation is the best fit material for that layer, but if the criteria are not met there is no best fit material in the reference database of known materials for that layer.

The following preferred criteria can be used to determine if the material having the minimum trial thickness standard deviation can be concluded to be the best fit material. The first criterion, shown as criterion 140D1 in FIG. 12A, is that the material having the minimum trial thickness standard deviation must also have the maximum ratio of the mean trial thickness to the trial thickness standard deviation (mean/STD) for each of the known materials in the reference database. The second criterion that needs to be satisfied, shown as criterion 140D2 in FIG. 12A, is to determine if the measured order of trial thickness standard deviation from minimum to maximum for all the known materials in the reference database measured for the layer matches the expected order of trial thickness standard deviation from minimum to maximum for all the known materials in the reference database for an ideal sample of known thickness of the material having minimum trial thickness standard deviation.

Figure 13:
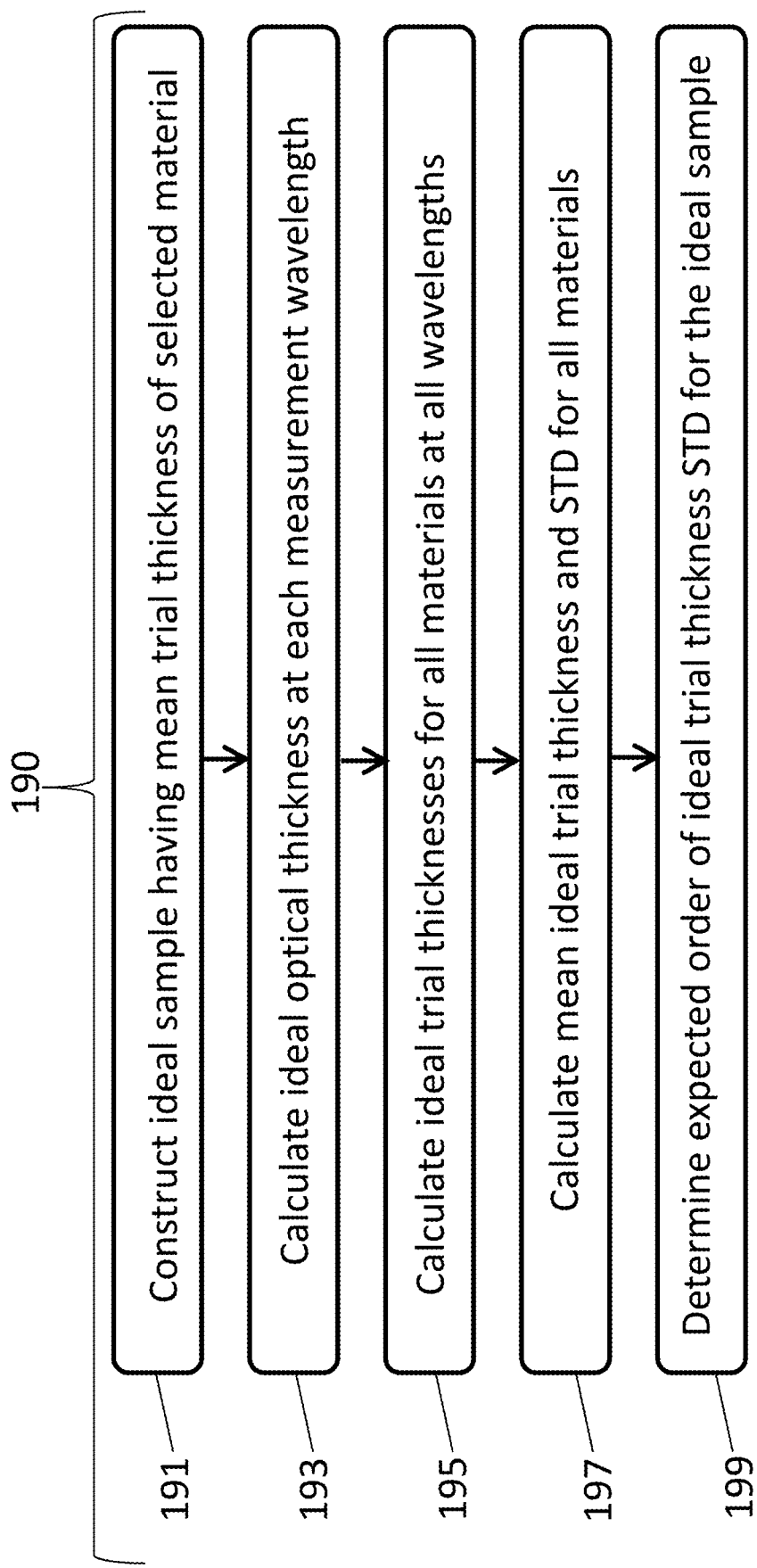
FIG. 13 shows a flowchart detailing the steps of determining the expected order of trial thickness standard deviation from minimum to maximum of an ideal sample for all the known materials in the reference database.

An ideal sample is defined as one which has the same measured thickness at all of the measured wavelengths. The expected order for an ideal sample for each known material in the reference database can be determined by the procedure described in FIG. 13. FIG. 13 shows a flowchart 190 detailing the steps of determining the expected order of trial thickness standard deviation from minimum to maximum for all the known materials in the reference database for an ideal sample of known thickness of the material having minimum trial thickness standard deviation. First, select the material having the minimum trial thickness standard deviation and construct an ideal sample of the selected material having an ideal thickness equal to the mean trial thickness measured for that material (Step 191). Next, calculate the ideal optical thickness for the selected material at each of the set of k distinct center wavelengths by multiplying the ideal thickness of the selected material by the group index of refraction of the selected material at the corresponding set of k distinct center wavelengths (Step 193). Next, using the ideal optical thickness data, calculate ideal trial thickness values as a function of measurement wavelength for all of the materials in the reference database of known materials (Step 195). The sets of k ideal trial thickness values for each of the m layers in the multilayer structure are calculated by dividing the ideal optical thickness of the layer in the multilayer structure at each of the k distinct center wavelengths by the known group index of refraction at each of the k corresponding wavelengths for each known material in the reference database. Step 195 is followed by Step 197 in which the mean ideal trial thickness and ideal trial thickness standard deviations are calculated for all of the materials in the reference database of known materials. Step 197 is followed by Step 199 in which the order from minimum to maximum ideal trial thickness standard deviation for all of the known materials in the reference database is determined. The order determined in Step 199 is defined as the expected order for the ideal sample. It is also noted that the trial thickness standard deviation of the ideal sample material will always be zero (0).

It has been found that when a layer in a multilayer structure containing a known material is measured by the method outlined in FIG. 12 and FIG. 12A, it will have the minimum trial thickness STD, and the order from lowest to highest calculated trial thickness standard deviation of all of the known materials in the reference database will always be the same for that material. Only when the measured order of trial thickness standard deviation agrees with the expected order for an ideal sample of the material having minimum trial thickness standard deviation can the material comprising that layer can be properly identified (outlined in FIG. 13).

An example follows, showing how to determine the best fit material for the first layer of the example three layer structure having the data shown in TABLE 2, using the procedure described in FIG. 12A and FIG. 13. The trial thicknesses for the first layer of the example three layer structure (column 2 in TABLE 2) are calculated by dividing the measured optical thickness at each of the k measurement wavelengths by each of the known group index of refraction of each of the materials in the reference database at each of the k corresponding wavelengths. The top portion of TABLE 4 (first 11 rows) shows the calculated trial thickness for the first layer of the example three layer structure for the six materials shown in TABLE 3. In particular, the third row of TABLE 4 is obtained by dividing the measured optical thickness of the example three layer structure measured at 450 nm by the known group index of refraction at 450 nm of each of the known materials in TABLE 3.

Columns 2-7 of TABLE 4 show the trial thicknesses calculated for the six known materials in the reference data base. Each successive row is calculated using the same set of measurement wavelengths from the known group index of refraction data base as used to measure the example 3 layer structure (Substep 140A). The last four rows of TABLE 4 show mean trial thickness, trial thickness standard deviation (STD), the ratio of the mean/STD of the trial thickness for the first layer of the example three layer structure shown in rows 3-11 of TABLE 4 (Substep 140B) and the order from minimum to maximum trial thickness standard deviation. The material in the reference database of known materials that has the minimum trial thickness standard deviation is selected as a candidate best fit material for that layer. From the data shown in TABLE 4, the candidate best fit material for the first layer of the example three layer structure can be identified as Starphire® glass (Substep 140C). It is noted that its trial thickness standard deviation is less than 1 μm and the second lowest trial thickness standard deviation (PVB in TABLE 4) is 4 times as great.

TABLE 4

Layer 1 calculated trial thickness values for known materials in the reference database and their statistics.

| λ (nm) | Starphire ® | PC | Borofloat ®33 | Plexiglas ® | TPU | PVB |
|---|---|---|---|---|---|---|
| | | | layer 1 trial thicknesses | | | |
| 450 | 9234.537 | 8503.385 | 9606.930 | 9417.389 | 9366.641 | 9451.687 |
| 500 | 9236.314 | 8612.474 | 9594.051 | 9424.682 | 9372.588 | 9448.966 |
| 520 | 9234.497 | 8650.685 | 9585.189 | 9423.284 | 9382.909 | 9451.474 |
| 550 | 9233.879 | 8694.535 | 9578.571 | 9424.361 | 9391.788 | 9451.75 |
| 568 | 9234.219 | 8713.632 | 9576.033 | 9425.835 | 9387.545 | 9453.995 |
| 600 | 9235.074 | 8745.571 | 9571.877 | 9427.688 | 9389.816 | 9454.313 |
| 650 | 9233.810 | 8786.938 | 9563.561 | 9428.437 | 9400.172 | 9457.357 |
| 700 | 9235.066 | 8818.794 | 9559.210 | 9431.343 | 9403.305 | 9458.683 |
| 750 | 9234.121 | 8843.943 | 9553.635 | 9431.901 | 9402.673 | 9456.409 |
| | | | layer 1 trial thickness statistics | | | |
| mean | 9234.613 | 8707.773 | 9576.562 | 9426.102 | 9388.604 | 9453.848 |
| STD | 0.7836 | 107.7549 | 17.0460 | 4.4448 | 12.9032 | 3.1827 |
| Mean/STD | 10468.340 | 80.846 | 559.897 | 2132.933 | 731.513 | 2990.546 |
| STD order | 1 | 6 | 5 | 3 | 4 | 2 |

We next check that the two criteria are met. Since, it is found that the Mean/STD for Starphire® is 3.5 times larger than the second largest value. (PVB) the first criterion is met. We next calculate the expected order of trial thickness standard deviation for an ideal sample of known thickness of Starphire® as described in FIG. 13. It is convenient to set the ideal thickness equal to the mean thickness of the material having minimum measured trial thickness standard deviation, 9234.613 µm for Starphire® in this example. Next, calculate the optical thickness that would be measured using the mean thickness for Starphire® at each of the same set of k measurement center wavelengths. Using the ideal optical thicknesses for the Starphire® sample, we calculate a set of ideal trial thickness for all the known materials in the reference database by dividing the ideal optical thickness of the Starphire® sample at each of the set of k measurement wavelengths by the group index of refraction of each material in the reference database at each of the k corresponding wavelengths. We then determine the average ideal trial thickness and ideal trial thickness standard deviations for each of the known materials in the reference database. The expected order of ideal trial thickness standard deviation from minimum to maximum is then determined for the ideal Starphire® sample.

TABLE 5 shows the results of these calculations using the reference database for the same six known materials shown in Tables 3 and 4. The results shown are for an ideal sample of 9234.613 µm thick Starphire®, which is shown to have an ideal trial thickness standard deviation of 0. The bottom line in TABLE 5 shows the expected order of ideal trial thickness standard deviation from minimum to maximum for an ideal sample of Starphire®. For Starphire®, using the six known materials in the known group index of refraction database of known materials, the expected order for ideal trial thickness standard deviation minimum to maximum for all the known materials in the reference database is Starphire®, PVB, Plexiglas®, TPU, Borofloat® 33 and PC. Since the measured trial thickness standard deviation order for Starphire® shown in TABLE 4 matches the expected ideal trial thickness standard deviation order shown in TABLE 5, the second criterion is met, and we can say that the best fit material for the first layer of the example three layer structure (data shown in TABLE 2) is Starphire®. We then find that the first layer of the example three layer structure is composed of 9234.613 µm thick Starphire®, the mean trial thicknesses for the selected material.

TABLE 5

Calculated ideal trial thickness values and statistics for known materials in the reference database assuming layer 1 is Starphire ®.

| λ (nm) | Starphire ® | PC | Borofloat ®33 | Plexiglas ® | TPU | PVB |
|---|---|---|---|---|---|---|
| 450 | 9234.613 | 8503.454 | 9607.009 | 9417.466 | 9366.717 | 9451.765 |
| 500 | 9234.613 | 8610.887 | 9592.284 | 9422.945 | 9370.862 | 9447.225 |
| 520 | 9234.613 | 8650.794 | 9585.309 | 9423.403 | 9383.027 | 9451.593 |
| 550 | 9234.613 | 8695.227 | 9579.333 | 9425.110 | 9392.535 | 9452.502 |
| 568 | 9234.613 | 8714.004 | 9576.441 | 9426.237 | 9387.946 | 9454.399 |
| 600 | 9234.613 | 8745.134 | 9571.399 | 9427.217 | 9389.347 | 9453.841 |
| 650 | 9234.613 | 8787.701 | 9564.392 | 9429.257 | 9400.989 | 9458.179 |
| 700 | 9234.613 | 8818.362 | 9558.741 | 9430.880 | 9402.844 | 9458.219 |
| 750 | 9234.613 | 8844.415 | 9554.144 | 9432.404 | 9403.174 | 9456.913 |
| | | | statistics | | | |
| mean | 9234.613 | 8707.775 | 9576.561 | 9426.102 | 9388.604 | 9453.848 |
| STD | 0.0000 | 107.9704 | 16.7829 | 4.5631 | 13.2750 | 3.5824 |
| STD Order | 1 | 6 | 5 | 3 | 4 | 2 |

Following the same procedure shown in FIG. 12A and FIG. 13, the second layer of the example three layer structure is found to be composed of 1502.2 µm thick PVB. When a layer is identified as PVB, the expected order for minimum to maximum trial thickness standard deviation is found to be PVB, Plexiglas®, Starphire®, TPU, Borofloat® 33 and PC. Similarly, the third layer of the example three layer structure is found to be composed of 11172.9 µm thick Borofloat® 33. When a layer is identified as Borofloat® 33 glass, the expected order for minimum to maximum trial thickness standard deviation is found to be Borofloat® 33, Starphire®, PVB, Plexiglas®, TPU and PC.

Although the interferometer apparatus and examples have been described herein as including a dual interferometer in the standard Michelson configuration it is noted that other interferometer configurations can be utilized including Mach Zehnder configurations and autocorrelator mode configurations as described in Marcus '409. Also the reference interferometer can be replaced with a highly accurate optical encoder on the variable optical path delay element 90.

The invention has been described in detail with particular reference to certain example embodiments thereof, but it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

PARTS LIST

10 Broadband Low-Coherence Light Source
11 First Low-Coherence Light Source
11a Second Low-Coherence Light Source
11b Third Low-Coherence Light Source
11c Fourth Low-Coherence Light Source
11d Fifth Low-Coherence Light Source
11e Sixth Low-Coherence Light Source
11f Seventh Low-Coherence Light Source
12 Variable Wavelength Tunable Filter
12a Tunable Filter
13 Tunable Light Source
13A Tunable Light Source
13B Tunable Light Source Second Section
14 Optical Fiber
15 First Dichroic Mirror
15a Second Dichroic Mirror
15b Third Dichroic Mirror
15c Fourth Dichroic Mirror
15d Fifth Dichroic Mirror
15e Sixth Dichroic Mirror
15f Seventh Dichroic Mirror
16 Fiber Collimator
18 Collimated Beam
18a Transmitted or First Part of the Low-Coherence Interference Beam
18b Reflected or Second Part of the Low-Coherence Interference Beam
18F Focusing Low-Coherence Beam
18R Reference Arm Collimated Beam
18S Sample Arm Collimated Beam
19 Second Collimated beam
19a First Part of the Second Low-Coherence Interference Beam
19b Second Part of the Second Low-Coherence Interference Beam
20 Polarizing Beam Splitter
20a Second Polarizing Beam Splitter
21 Wavelength Division Multiplexer
22 Quarter Wave Plate
22a Second Quarter Wave Plate
23 Fiber Collimator
24 Beam Splitter
25 Combined Collimated Beam
25a First Combined Low-Coherence Interference Beam
25b Second Combined Low-Coherence Interference Beam
25R Reference Arm Combined Collimated Beam
25S Sample Arm Combined Collimated Beam
26 Sample Arm Lens
28 Multilayer Structure
28a First Layer
28b Second Layer
28c Third Layer
28d Fourth Layer
28e Fifth Layer
30 Reference Arm Lens
32 Reference Mirror
32L Laser Reference Mirror
34 Mirror
35 Mirror
36 Mirror
37 Mirror
38 Balanced Detector
38a First Detector
38b Second Detector
39 Second Balanced Detector
39a First Detector
39b Second Detector
40 Laser
42 Collimated Laser Beam
42C Laser Interference Beam
42R Reference Arm Collimated Laser Beam
42S Sample Arm Collimated Laser Beam
44 Mirror
46 Beam Splitter
48 Mirror
50 Detector
52 Fiber Collimator
53 Fiber Collimator
54S Sample Arm Optical Fiber
54R Reference Arm Optical Fiber
57 Optical Probe
60 Portable Optical Probe
57s Optical Probe Mounting Surface
58A Fiber Collimator
58B Fiber Collimator
62 Laser Interference Signal
70 Zero-Crossings
71 Low-Coherence Interferometer Scan
71 First Optical Interface Location
72 Second Optical Interface Location
73 Third Optical Interface Location
74 Fourth Optical Interface Location
75 Fifth Optical Interface Location
76 Sixth Optical Interface Location
78 Cavity
80 Measurement Cell
82 Sample
82A Three layer Sample
84 Top Flat
86 Bottom Flat 88 Spacer
90 Variable Optical Path Delay Element
100 Interferometer Apparatus
100A Interferometer Apparatus
100B Interferometer Apparatus
100C Interferometer Apparatus
100D Interferometer Apparatus
100E Interferometer Apparatus
100F Interferometer Apparatus
110 Low-Coherence Interferometer
110A Low-Coherence Interferometer
110B Low-Coherence Interferometer
110C Low-Coherence Interferometer
110D Low-Coherence Interferometer
110E Low-Coherence Interferometer
110F Low-Coherence Interferometer
120 Laser Interferometer
130 Flow Chart
132 Step
134 Step
136 Step
138 Step
140 Step
140A Substep
140B Substep
140C Substep
140D Substep
140D1 Criterion
140D2 Criterion
142 Step
150 Flow Chart
152 Step
154 Step
156 Step
158 Step
160 Step
162 Step
164 Step
170 Flow Chart
172 Step
174 Step
176 Step
178 Step
180 Step
182 Step
184 Step
186 Step
190 Flow Chart
191 Step
193 Step
195 Step
197 Step
199 Step

We claim:

1. A method of characterizing each layer in a multilayer structure comprising m layers where m is an integer greater than 1, the method comprising the steps of:
    a) providing an interferometer apparatus with a low-coherence tunable light source which can be tuned to a set of k distinct center wavelengths where k is an integer greater than 2;
    b) aligning a portion of the multilayer structure with respect to a measurement region of the interferometer apparatus;
    c) using the interferometer apparatus to observe layers in the multilayer structure, and to measure optical thickness of each of the observed layers in the multilayer structure with the low-coherence tunable light source being tuned to each of the k distinct center wavelengths;
    d) determining the number of layers m in the multilayer structure by setting m equal to the maximum number of observed layers measured using the low-coherence interferometer with the low-coherence tunable light source tuned to each of the k distinct center wavelengths;
    e) for each of the m layers, comparing the optical thickness measured with the low-coherence tunable light source tuned to each of the k distinct center wavelengths to a reference database of known material group index of refraction dispersion curves measured at the same set of k distinct center wavelengths and determining which layers have a best fit material in the reference database; and
    f) identifying the material composition of each of the m layers which have a best fit material in the reference database.

2. The method of claim 1, where each of the m layers of the multilayer structure is at least partially optically transmissive to light over at least part of the optical spectrum of the low-coherence tunable light source.

3. The method of claim 1, wherein the interferometer apparatus further comprises a variable optical path delay element which is repetitively scanned from a start position to an end position and then from the end position to the start position when repetitively measuring the optical thicknesses of each layer of the m layer multilayer structure, the distance between the start position and the end position being larger than the total optical thickness of the multilayer structure.

4. The method of claim 3, wherein the interferometer apparatus includes a reference interferometer used to track the location of the variable optical path delay element as the variable optical path delay element is repetitively scanned.

5. The method of claim 1, wherein each of the set of k distinct center wavelengths of the low-coherence tunable light source is switched on one at a time during measurement.

6. The method of claim 1, wherein the low-coherence tunable light source includes one or more superluminescent diodes each having distinct center wavelengths in the set of k distinct center wavelengths.

7. The method of claim 1, wherein the low-coherence tunable light source includes a supercontinuum light source with a tunable filter which can be tuned to one or more of the wavelengths in the set of k distinct center wavelengths.

8. The method of claim 7, wherein the tunable filter comprises one or more distinct center wavelength narrow bandpass filters which are selected one at a time.

9. The method of claim 8, wherein the one or more distinct center wavelength narrow bandpass filters are mounted on a filter wheel.

10. The method of claim 1, wherein the interferometer apparatus further comprises first and second balanced detectors which detect light in first and second wavelength regions of the optical spectrum respectively, one or more of the set of k distinct center wavelengths are in the first wavelength region of the optical spectrum, and one or more of the set of k distinct center wavelengths are in the second wavelength region of the optical spectrum.

11. The method of claim 10, wherein the first and second balanced detectors are comprised of light sensors comprising silicon and indium gallium arsenide, respectively.

12. The method of claim 11, wherein the optical thickness of the observed layers in the multilayer structure are measured simultaneously using light having two distinct center wavelengths in the set of k distinct center wavelengths of the low-coherence tunable light source.

13. The method of claim 12, wherein interference occurring at the first of the two distinct center wavelengths is detected with the first balanced detector, while interference occurring at the second of the two distinct center wavelengths is detected with the second balanced detector.

14. The method of claim 1, wherein for each of the m layers in the multilayer structure, the method further comprises the steps of:
   a) calculating sets of k trial thickness values for each known material in the reference database of known materials by dividing the measured optical thickness at each of the k distinct center wavelengths by the known group index of refraction at each of the k corresponding wavelengths for each known material in the reference database of known materials;
   b) calculating a mean trial thickness and trial thickness standard deviation of the sets of k trial thickness values for each of the known materials in the reference database;
   c) determining a measured order of trial thickness standard deviation from minimum to maximum for all of the known materials in the reference database; and
   d) determining if a material having the minimum trial thickness standard deviation meets best fit material criteria.

15. The method of claim 14, wherein the step of determining it the material having the minimum trial thickness standard deviation meets the best fit material criteria further comprises:
   a) determining if the material having the minimum trial thickness standard deviation also has a maximum ratio of mean trial thickness to the trial thickness standard deviation for all of the known materials in the reference database; and
   b) determining if the measured order of trial thickness standard deviation matches an expected order of trial thickness standard deviation for an ideal sample of known thickness of the material having the minimum trial thickness standard deviation.

16. The method of claim 15, wherein determining the expected order of trial thickness standard deviation for an ideal sample of known thickness of the material having the minimum trial thickness standard deviation comprises the steps of:
   a) selecting the material having the minimum trial thickness standard deviation and constructing an ideal sample of the selected material having an ideal thickness equal to the mean trial thickness measured for that material;
   b) calculating an ideal optical thickness at each of the k distinct center wavelengths by multiplying an ideal thickness of the selected known material by a known group index of refraction of the selected known material at each of the corresponding k distinct center wavelengths;
   c) calculating sets of k ideal trial thickness values for each known material in the reference database of known materials by dividing the ideal optical thickness at each of the k distinct center wavelengths by the known group index of refraction at each of the k corresponding wavelengths for each known material in the reference database;
   d) calculating a mean ideal trial thickness and ideal trial thickness standard deviation of the sets of k ideal trial thickness values for each of the known materials in the reference database; and
   e) determining the order of ideal trial thickness standard deviation from minimum to maximum for all of the known materials in the reference database and defining this as the expected order.

17. The method of claim 14, wherein the thickness of each of the m layers in the multilayer structure which have a best fit material in the reference database is given by the calculated mean trial thickness for the known material having the minimum standard deviation for that layer.

18. The method of claim 1, wherein the interferometer apparatus further comprises an optical probe for focusing incident light from the low-coherence tunable light source onto the multilayer structure.

19. The method of claim 1, wherein the multilayer structure comprises a measurement cell comprising a top optical flat and a bottom optical flat separated by a spacer containing a receiving surface located above a top optically flat surface of the bottom optical flat and below a bottom optically flat surface of the top flat for disposing a sample containing a layer of a prospective material to be added to the group index of refraction database of known materials.

20. The method of claim 19, wherein the sample containing the layer of the prospective material to be added to the group index of refraction database of known materials is a single layer sample of the material to be added to the group index of refraction database of known materials, the method further comprising the steps of:
   a) determining the thickness of a total air gap between the bottom surface of the top optical flat and the top surface of the bottom optical flat of the measurement cell with the sample containing the layer of the prospective material to be added to the database of known materials being absent from the receiving surface, by dividing total air gap optical thicknesses measured at each of the k distinct center wavelengths by the group index of refraction of air at each of the k respective wavelengths, and calculating a mean value of the thickness of the total air gap;
   b) disposing the sample containing the layer of the prospective material to be added to the database of known materials on the receiving surface of the measurement cell;
   c) determining a thicknesses of the top air gap between the bottom surface of the top optical flat and the top surface of the single layer sample and a bottom air gap between the bottom surface of the single layer sample and the top surface of the bottom optical flat by dividing top and bottom air gap optical thicknesses measured at each of the k distinct center wavelengths by the group index of refraction of air at each of the k respective wavelengths, and calculating mean values of the top and bottom air gap thicknesses;
   d) determining a thickness of the single layer sample of the prospective material to be added to the group index of refraction database of known materials by subtracting a sum of the top air gap and bottom air gap thicknesses from a total air gap thickness; and
   e) determining a group index of refraction dispersion curve of the prospective material to be added to the group index of refraction database by dividing the optical thickness of the single layer sample of the material to be added to the group index of refraction database of known materials measured at each of the k distinct center wavelengths by the thickness of the single layer sample of the prospective material to be added to the group index of refraction database of known materials.

21. The method of claim 20, wherein the group index of refraction dispersion curve of the layer of the prospective material to be added to the group index of refraction database measured at each of the k distinct center wavelengths is added to a group index of refraction database of known materials group index of refraction dispersion curves.

22. The method of claim 19, wherein the sample containing the layer of the prospective material to be added to the group index of refraction database of known materials is a three layer laminate containing the layer of prospective material to be added to the group index of refraction database disposed between a layer of first known material and a layer or second known material, the method further comprising the steps of:
   a) determining the thickness of a total air gap between the bottom surface of the top optical flat and the top surface of the bottom optical flat of the measurement cell with the sample containing the layer of prospective material to be added to the database of known materials being absent from the receiving surface by dividing total air gap optical thicknesses measured at each of the k distinct center wavelengths by the group index of refraction of air at each of the k respective wavelengths and calculating a mean value of the thickness of the total air gap;
   b) disposing the three layer laminate containing the layer of the prospective material to be added to the database of known materials on the receiving surface of the measurement cell;
   c) determining thicknesses of the top air gap between the bottom surface of the top optical flat and the top surface of the first known material and the bottom air gap between the bottom surface of the second known material and the top surface of the bottom optical flat by dividing top and bottom air gap optical thicknesses measured at each of the k distinct center wavelengths by the group index of refraction of air at each of the k respective wavelengths and calculating mean values of the top and bottom air gap thicknesses;
   d) determining thicknesses of the first known material and the second known material by dividing measured optical thicknesses at each of the k distinct center wavelengths of the first and second known materials by their respective known group indexes of refraction at each of the k respective wavelengths and calculating mean values of the thickness of the first known material and the second known material respectively;
   e) determining a thickness of the layer of the prospective material to be added to the database of known materials by subtracting the sum of the top air gap thickness, the first known material thickness, the second known material thickness and the bottom air gap thicknesses from the total air gap thickness; and
   f) determining a group index of refraction dispersion curve of the prospective material to be added to the database by dividing an optical thickness of the material to be added to the group index of refraction database of known materials measured at each of the k distinct center wavelengths by the thickness of the layer of the prospective material to be added to the database of known materials.

23. The method of claim 22, wherein the group index of refraction dispersion curve of the layer of the prospective material to be added to the group index of refraction database measured at each of the k distinct center wavelengths is added to a database of known material group index of refraction dispersion curves.

24. The method of claim 22, wherein the first known material and the second known material are comprised of the same known material.

* * * * *